United States Patent
Tabata et al.

(10) Patent No.: US 8,135,522 B2
(45) Date of Patent: *Mar. 13, 2012

(54) CONTROL DEVICE FOR VEHICULAR DRIVE SYSTEM

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1761 days.

This patent is subject to a terminal disclaimer.

(21) Appl. No.: 11/062,494

(22) Filed: Feb. 23, 2005

(65) Prior Publication Data

US 2009/0118955 A1    May 7, 2009

(30) Foreign Application Priority Data

Feb. 26, 2004    (JP) .................................. 2004-052212

(51) Int. Cl.
*G06F 19/00* (2006.01)
*B60K 17/04* (2006.01)

(52) U.S. Cl. ............ 701/66; 701/52; 180/65.23; 477/34

(58) Field of Classification Search .................... 701/53, 701/22, 66, 51, 55, 56, 62, 63, 52, 54; 180/65.3, 180/65.2, 65.6, 65.23, 65.21; 477/3, 15, 477/34, 35; 475/1, 5; 74/572; 903/945
See application file for complete search history.

(56) References Cited

U.S. PATENT DOCUMENTS

| | | | | |
|---|---|---|---|---|
| 4,588,040 A | * | 5/1986 | Albright et al. | 180/165 |
| 5,193,634 A | * | 3/1993 | Masut | 180/65.25 |
| 5,327,987 A | * | 7/1994 | Abdelmalek | 180/65.25 |

(Continued)

FOREIGN PATENT DOCUMENTS

JP    62-216840    9/1987

(Continued)

OTHER PUBLICATIONS

International Search Report for Appln. No. JP-2005/003432 dated Sep. 9, 2005.

*Primary Examiner* — Ronnie Mancho
(74) *Attorney, Agent, or Firm* — Kenyon & Kenyon LLP

(57) ABSTRACT

A vehicular drive system switchable between a continuously-variable and step-variable shifting states, and a control device for controlling the vehicular drive system so as to reduce a shifting shock of an automatic transmission included in the drive system, which takes place due to an overlap control involving a switching control of the drive system and a shifting control of the automatic transmission.

Execution-timing control means 82 is provided to command switching control means 50 and step-variable shifting control means 54 to sequentially execute a switching control by the switching control means to switch transmission mechanism 10 between an electrically established continuously-variable shifting state and a step-variable shifting state, and a shifting control by the step-variable shifting control means to shift an automatic transmission portion 20, even when an overlap control involving the switching control and the shifting control is required, whereby the switching and shifting controls can be rapidly completed. Since the transmission mechanism 10 is not switched during the shifting control of the automatic transmission portion 20, the input speed of the automatic transmission portion 20 will not change due to the switching control, apart from a change of the input speed as a result of the shifting control, making it possible to prevent the complicated shifting control and reduce the consequent shifting shock.

18 Claims, 13 Drawing Sheets

U.S. PATENT DOCUMENTS

| | | | |
|---|---|---|---|
| 5,343,970 A * | 9/1994 | Severinsky | 180/65.25 |
| 6,083,138 A * | 7/2000 | Aoyama et al. | 477/5 |
| 6,146,302 A * | 11/2000 | Kashiwase | 475/5 |
| 6,344,008 B1 * | 2/2002 | Nagano et al. | 475/1 |
| 6,428,444 B1 * | 8/2002 | Tabata | 477/3 |
| 6,524,216 B2 * | 2/2003 | Suzuki et al. | 477/3 |
| 6,886,648 B1 | 5/2005 | Hata et al. | |
| 2005/0209760 A1 * | 9/2005 | Tabata et al. | 701/53 |

FOREIGN PATENT DOCUMENTS

| | | |
|---|---|---|
| JP | 3-61762 | 3/1991 |
| JP | 5-164205 | 6/1993 |
| JP | 10-2241 | 1/1998 |
| JP | 11-198668 | 7/1999 |
| JP | 11-198668 A | 7/1999 |
| JP | 11-198670 | 7/1999 |
| JP | 11-198670 A | 7/1999 |
| JP | 11-217025 | 8/1999 |
| JP | 11-217025 A | 8/1999 |
| JP | 00-209706 | 7/2000 |
| JP | 03-016749 | 2/2003 |
| JP | 03-127681 | 5/2003 |
| JP | 03-130202 | 5/2003 |
| JP | 03-130203 | 5/2003 |
| JP | 2003-127681 A | 5/2003 |
| JP | 2003-130202 A | 5/2003 |
| JP | 2003-130203 A | 5/2003 |
| JP | 04-236406 | 8/2004 |
| WO | WO 03/016749 A1 | 2/2003 |

* cited by examiner

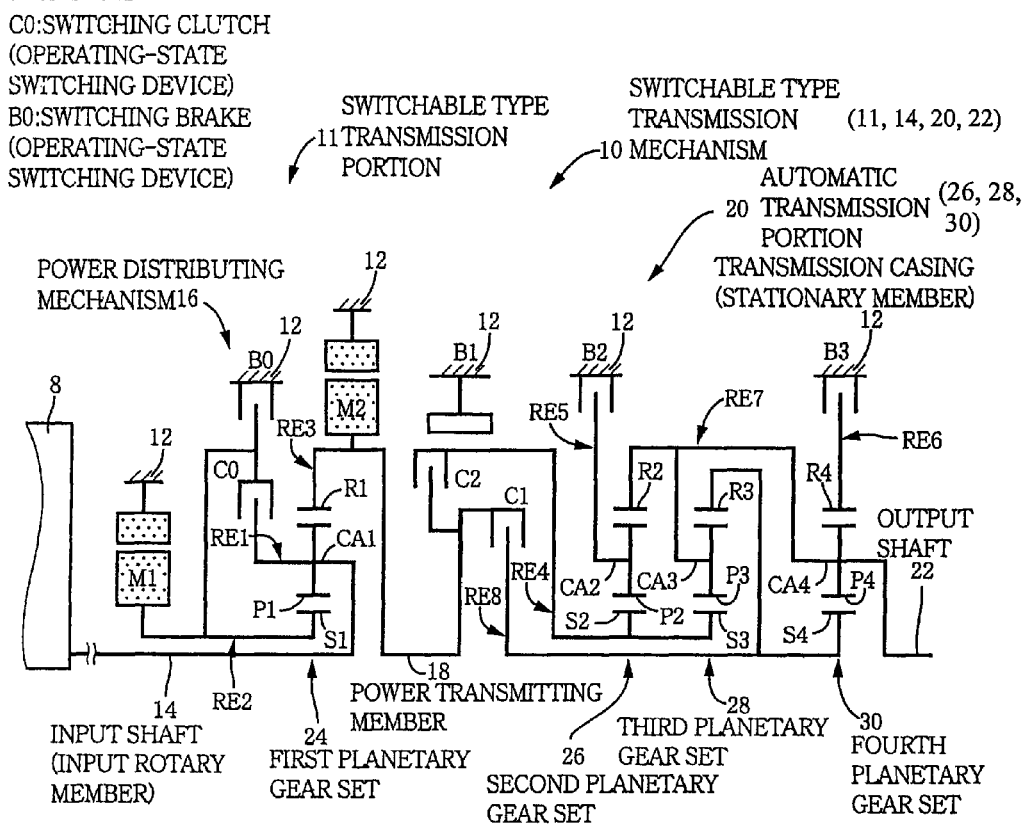

| | C0 | C1 | C2 | B0 | B1 | B2 | SPEED RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | SPREAD 3.977 |
| R | | | ○ | | | ○ | 2.393 | |
| N | ○ | | | | | | | |

○ ENGAGED
◎ ENGAGED FOR STEP-VARIABLE SHIFTING, AND RELEASED FOR CONTINUOUSLY-VARIABLE SHIFTING

CONTROL DEVICE FOR VEHICULAR DRIVE SYSTEM

TECHNICAL FIELD

The present invention relates to a control device for a vehicular drive system, and more particularly to control techniques for switching the drive system between an electrically established continuously-variable shifting state and a step-variable shifting state.

BACKGROUND ART

There is known a vehicle provided with a control device for controlling a drive system including a power distributing mechanism arranged to distribute an output of an engine to a first electric motor and an output shaft, and a second electric motor disposed between the output shaft of the power distributing mechanism and drive wheels of the vehicle. Examples of this control device include a control device for a hybrid vehicle as disclosed in Patent Document 1. In the hybrid vehicle drive systems disclosed in this document, a major portion of the drive force generated by the engine is mechanically transmitted directly to the drive wheels, while the rest of the drive force is electrically transmitted from the first electric motor to the second electric motor through an electric path therebetween, and the drive systems are controlled such that the engine is kept in an optimum operating state, permitting the vehicle to run with an improved fuel economy.
Patent Document 1: JP-2003-130202A
Patent Document 2: JP-2003-130203A
Patent Document 3: JP-2003-127681A
Patent Document 4: JP-11-19868A
Patent Document 5: JP-11-198670A
Patent Document 6: JP-11-217025A
Patent Document 7: WO 03/016749A1

DISCLOSURE OF THE INVENTION

Problem Solved by the Invention

Generally, a continuously-variable transmission is known as a device for improving the fuel economy of a vehicle, while on the other hand a planetary gear type power transmitting device such as a step-variable automatic transmission is known as a device having a high power transmitting efficiency. However, there is not known any power transmitting mechanism that is suitable for improving both of the fuel economy and the power transmitting efficiency. The conventional hybrid vehicle drive systems as disclosed in the above-identified documents, for example, have an electric path through which an electric energy is transmitted from the first electric motor to the second electric motor, that is, a power transmitting path through which a portion of the vehicle drive force is transmitted as an electric energy. These drive systems require the first electric motor to be large-sized with an increase of the required output of the engine, so that the second electric motor operated with the electric energy generated from the first electric motor is also required to be large-sized, whereby the drive systems tend to be unfavorably large-sized. Alternatively, the conventional vehicular drive systems, wherein a portion of the output of the engine is once converted into an electric energy and then transmitted to the drive wheels, have a risk of deterioration of the fuel economy in some running condition of the vehicle, for instance, during running of the vehicle at a relatively high speed.

As a result of extensive studies in an effort to solve the problems described above, the present inventors found that the first and second electric motors are not required to have large sizes where the engine is operated in a normal or comparatively low output range, but the required sizes of the electric motors are increased depending upon the required capacity or output where the engine is operated in a high output range, for example, to provide a maximum output, for high output running of the vehicle. Based on this fact, the inventors further found that the required sizes of the first and second electric motors can be reduced to make the drive system compact, by controlling the drive system such that the output of the engine is transmitted to the drive wheels primarily through a mechanical power transmitting path when the engine is operated in a high output range. The inventors also found that the transmission of the engine output to the drive wheels primarily through the mechanical power transmitting path makes it possible to further improve the fuel economy by reducing a loss of energy conversion by the first electric motor from a portion of the engine output into an electric energy which is supplied to the second electric motor through the electric path and which is converted by the second electric motor into a mechanical energy to be transmitted to the drive wheels, during high-speed running of the vehicle. Thus, the drive system can be small-sized and the fuel economy can be improved by suitably switching the drive system between a continuously-variable shifting state in which the drive system is operable as an electrically controlled continuously variable transmission, and a step-variable shifting state in which the drive system is operable as a step-variable transmission, depending upon the specific condition of the vehicle.

Where the drive system including as a major device the power distributing mechanism switchable between the above-described continuously-variable and step-variable shifting states is constituted by the power distributing mechanism disclosed in the above-identified Patent Document 1 and a step-variable automatic transmission disposed between the output shaft of the power distributing mechanism and the drive wheels, there is a possibility that a switching control for controlling a switching operation of the drive system between the continuously-variable and step-variable shifting states and a shifting control to control a shifting operation of the step-variable automatic transmission may overlap each other. The shifting control is executed not for merely commanding the step-variable automatic transmission to effect a shifting action, but is arranged to control from time to time engaging forces of coupling devices incorporated within the step-variable automatic transmission so as to optimize the input and output speeds of the coupling devices on the basis of a detected state of progress of the shifting action, for minimizing a shifting shock of the automatic transmission. If the switching control of the drive system, more precisely, the switching control of the power distributing mechanism is effected irrespective of a change of the input speed of the step-variable automatic transmission, the input speed of the automatic transmission which is the output speed of the power distributing mechanism may change due to the switching control of the power distributing mechanism. In other words, there is a possibility that the switching control of the power distributing mechanism causes a change of the input speed of the step-variable automatic transmission, irrespective of the shifting control of the automatic transmission. In this case, the shifting control of the step-variable automatic transmission so as to reduce the shifting shock while dealing with the change of its input speed may be complicated, giving rise to a risk of increase of the shifting shock.

The present invention was made in view of the background art described above. It is therefore an object of the present invention to provide a vehicular drive system switchable between a continuously-variable shifting state in which the drive system functions as an electrically controlled continuously variable transmission, and a step-variable shifting state in which the drive system functions as a step-variable transmission, and to provide a control device for the vehicular drive system including the automatic transmission, which control device is arranged to reduce the shifting shock of the automatic transmission due to overlapping switching and shifting controls in which the switching control to control the switching operation of the drive system between the continuously-variable and step-variable shifting state overlaps the shifting control to control the shifting operation of the automatic transmission.

Means for Solving the Problem

According to a 1$^{st}$ form of this invention, there is provided a control device for a vehicular drive system arranged to transmit an output of an engine to a drive wheel of a vehicle, comprising (a) a switchable type transmission mechanism switchable between a continuously-variable shifting state in which the switchable type transmission mechanism is operable as an electrically controlled continuously variable transmission, and a step-variable shifting state in which the switchable type transmission mechanism is operable as a step-variable transmission, (b) switching control means for placing the switchable type transmission mechanism selectively in one of the continuously-variable shifting state and the step-variable shifting state, on the basis of a predetermined condition of the vehicle, (c) shifting control means for control a shifting operation of an automatic transmission included in the switchable type transmission mechanism, on the basis of the condition of the vehicle, and (d) execution-timing control means for commanding the switching control means and the shifting control means to sequentially execute a switching control by the switching control means and a shifting control by the shifting control means, even when an overlap control involving the switching control and the shifting control is required.

Advantages of the Invention

In the present control device provided for the switchable type transmission mechanism switchable between the continuously-variable shifting state in which the transmission mechanism is operable as the electrically controlled continuously variable transmission and the step-variable shifting state in which the transmission mechanism is operable as the step-variable transmission, the execution-timing control means described above is arranged to command the switching control means and the shifting control means to sequentially execute the switching control of the switchable type transmission mechanism by the switching control means and the shifting control by the shifting control means to shift the automatic transmission included in the switchable type transmission mechanism, even when the overlap control involving the switching control and the shifting control is required. Accordingly, the present control device prevents overlapping of the switching control and the shifting control, and permits the switching and shifting controls to be rapidly completed. Since the shifting state of the switchable type transmission mechanism is not switched under the control of the switching control means during the shifting control of the automatic transmission by the shifting control means, the input speed of the automatic transmission will not change due to the switching control, apart from a change of the input speed as a result of the shifting control, making it possible to prevent the complicated shifting control and reduce the consequent shifting shock of the automatic transmission.

According to a preferred 2$^{nd}$ form of this invention according to the 1$^{st}$ form, the execution-timing control means commands the switching control means to execute the switching control first. In this form of the invention, the overlapping of the switching and shifting controls is prevented. For example, the switching control by the switching control means to switch the switchable type transmission mechanism from the continuously-variable shifting state to the step-variable shifting state is executed before the shifting control of the automatic transmission by the shifting control means. In this case, the shifting control of the automatic transmission is executed after the input speed of the automatic transmission has been stabilized, so that the complicated shifting control is prevented, and the shifting control is rapidly completed, whereby the shifting shock is reduced. Where the switching control by the switching control means to switch the switchable type transmission mechanism from the step-variable shifting state to the continuously-variable shifting state is executed before the shifting control of the automatic transmission by the shifting control means, the input speed of the automatic transmission is rapidly changed by the switchable type transmission mechanism placed in the continuously-variable shifting state, so that the shifting control of the automatic transmission is rapidly completed, whereby the shifting shock is reduced.

According to a preferred 3$^{rd}$ form of this invention according to the 1$^{st}$ form, the execution-timing control means commands the shifting control means to execute the shifting control first. In this form of the invention, the overlapping of the switching and shifting controls is prevented. For example, the shifting control of the automatic transmission by the shifting control means is first executed while the switchable type transmission mechanism is maintained in the step-variable shifting control state, and then the switching control by the switching control means to switch the switchable type transmission mechanism from the step-variable shifting state to the continuously-variable shifting state is executed. In this case, the shifting control of the automatic transmission is executed while the input speed of the automatic transmission is held stable, so that the complicated shifting control is prevented, and the shifting control is rapidly completed, whereby the shifting shock is reduced. Where the shifting control of the automatic transmission by the shifting control means is first executed while the switchable type transmission mechanism is maintained in the continuously-variable shifting state, and then the switching control by the switching control means to switch the switchable type transmission mechanism from the continuously-variable shifting state to the step-variable sifting state, the input speed of the automatic transmission is rapidly changed by the switchable type transmission mechanism maintained in the continuously-variable shifting state, so that the shifting control of the automatic transmission is rapidly completed, whereby the shifting shock is reduced.

According to a preferred 4$^{th}$ form of this invention according to the 1$^{st}$ form, the execution-timing control means determines one of the switching control by the switching control means and the shifting control by the shifting control means which should be executed before the other of the switching and shifting controls, on the basis of the condition of the vehicle. In this form of the invention, the overlapping of the switching and shifting controls is suitably prevented depending upon the condition of the vehicle.

According to a preferred 5th form of this invention according to the 1st form, the execution-timing control means determines one of the switching control by the switching control means and the shifting control by the shifting control means which should be executed before the other of the switching and shifting controls, on the basis of one the continuously-variable and step-variable shifting states in which the switchable type transmission mechanism is presently placed. In this form of the invention, the overlapping of the switching and shifting controls is prevented.

According to a preferred 6th form of this invention according to the 1st form, the execution-timing control means determines one of the switching control by the switching control means and the shifting control by the shifting control means which should be executed before the other of the switching and shifting controls, on the basis of one of the continuously-variable and step-variable shifting states to which the switchable type transmission mechanism is to be switched. Accordingly, the overlapping of the switching and shifting controls is prevented.

According to a preferred 7th form of the invention according to any one of the 1st through 6th forms, the predetermined condition of the vehicle is determined on the basis of a predetermined upper limit value of a running speed of the vehicle, and the switching control means places the switchable type transmission mechanism in the step-variable shifting state when an actual value of the running speed of the vehicle is higher than the predetermined upper limit value. When the actual vehicle speed is higher than the upper limit value, therefore, the output of the engine is transmitted to the drive wheel primarily through a mechanical power transmitting path, so that the fuel economy is improved owing to reduction of a loss of conversion between mechanical and electric energies in the step-variable shifting state as compared with that in the continuously-variable shifting state. The predetermined upper limit value is determined to determine whether the vehicle is in the high-speed running state.

Preferably, the predetermined condition of the vehicle is determined on the basis of a predetermined upper limit value of a running speed of the vehicle, and the switching control means inhibits the switchable type transmission mechanism from being placed in the continuously-variable shifting state when an actual value of the running speed of the vehicle is higher than the predetermined upper limit value. When the actual vehicle speed is higher than the upper limit value, therefore, the switchable type transmission mechanism is prevented from being placed in the continuously-variable shifting state, so that the output of the engine is transmitted to the drive wheel of the vehicle primarily through a mechanical power transmitting path, and the fuel economy is improved owing to reduction of a loss of conversion between mechanical and electric energies in the step-variable shifting state as compared with that in the continuously-variable shifting state.

According to a preferred 8th form of this invention according to any one of the 1st through 7th forms, the predetermined condition of the vehicle is determined on the basis of a predetermined upper limit value of a drive-force-related value of the vehicle, and the switching control means places the switchable type transmission mechanism in the step-variable shifting state when the drive-force-related value of the vehicle is higher than the predetermined upper limit value. According to this arrangement, the output of the engine is transmitted to the drive wheel primarily through a mechanical power transmitting path, when the drive-force-related value such as the vehicle-operator's desired vehicle drive force or the actual vehicle drive force is higher than a predetermined upper limit. Accordingly, the required maximum amount of electric energy that should be generated by the first electric motor can be reduced, so that the required size of the first electric motor can be reduced, whereby the required size of the vehicular drive system including the first electric motor can be reduced. The drive-force-related value is a parameter directly or indirectly relating to a drive force of the vehicle, such as the output torque of the engine, output torque of the switchable type transmission mechanism, drive torque of the drive wheel, any other torque or rotary drive force in the power transmitting path, and the angle of opening of a throttle valve of the engine which represents such torque values. The above-described predetermined upper limit value of the vehicle output is determined to determine whether the vehicle is in the high-output running state.

Preferably, the predetermined condition of the vehicle is determined on the basis of a predetermined upper limit value of a drive-force-related value of the vehicle, and the switching control means inhibits the switchable type transmission mechanism from being placed in the step-variable shifting state when the drive-force-related value of the vehicle is higher than the predetermined upper limit value. According to this arrangement, the switchable type transmission mechanism is prevented from being placed in the continuously-variable shifting state when the drive-force-related value of the vehicle such as the vehicle-operator' desired vehicle drive force or the actual vehicle drive force is higher than the predetermined upper limit value, the required maximum amount of electric energy that should be generated by the first electric motor can be reduced, and the output of the engine is transmitted to the drive wheel primarily through a mechanical power transmitting path, so that the required size of the first electric motor can be reduced, whereby the required size of the vehicular drive system including the first electric motor can be reduced.

According to a preferred 9th form of this invention according to any one of the 1st through 8th forms, the predetermined condition of the vehicle is determined on the basis of an actual value of a running speed of the vehicle and an actual value of a drive-force-related value of the vehicle and according to a stored switching boundary line map including a high-speed-running boundary line and a high-output-running boundary line which are defined by parameters in the form of the running speed of the vehicle and the drive-force-related value. According to this arrangement, the determination as to whether the vehicle is in the high-speed running state or in the high-output running state can be facilitated.

According to a preferred 10th form of this invention according to any one of the 1st through 8th forms, the predetermined condition of the vehicle is a functional-deterioration determining condition which is satisfied when a function of any one of control components for placing the switchable type transmission mechanism in the electrically established continuously-variable shifting state is deteriorated, and the switching control means places the switchable type transmission mechanism in the step-variable shifting state when the functional-deterioration determining condition is satisfied. According to this arrangement, in the event of, determination of the functional deterioration which disables the switchable type transmission mechanism to be placed in the continuously-variable shifting state, the transmission mechanism is placed in the step-variable shifting state, so that the vehicle can be run in the step-variable shifting state, even in the presence of the functional deterioration.

Preferably, the predetermined condition of the vehicle is a functional-deterioration determining condition which is satisfied when a function of any one of control components for placing the switchable type transmission mechanism in the electrically established continuously-variable shifting state is deteriorated, and the switching control means inhibits the switchable type transmission mechanism from being placed in the step-variable shifting state when the functional-deterioration determining condition is satisfied. According to this arrangement, in the event of determination of the functional deterioration of any control component for placing the switchable transmission mechanism in the electrically established continuously-variable shifting state, the switchable type transmission mechanism is prevented from being placed in the continuously-variable shifting state, so that the transmission mechanism is placed in the step-variable shifting state to permit the vehicle to run in the step-variable shifting state, even in the presence of the functional deterioration which disables the switchable type transmission mechanism to be placed in the continuously-variable shifting state.

According to a preferred 11$^{th}$ form of this invention according to any one of the 1$^{st}$ through 10$^{th}$ forms, the switchable type transmission mechanism includes a first electric motor, a power distributing mechanism operable to distribute the output of the engine to the first electric motor and a power transmitting member, and a second electric motor disposed between the power transmitting member and the drive wheel. Preferably, the power distributing mechanism has a first element fixed to the engine, a second element fixed to the first electric motor, and a third element fixed to the second electric motor and the power transmitting member, and includes an operating-state switching device operable to switch the switchable type transmission mechanism between the continuously-variable and step-variable shifting states, and the switching control means controls the operating-state switching device to thereby switch the switchable type transmission mechanism between the continuously-variable and step-variable shifting states. In this form of the invention, the operating-state switching device is controlled by the switching control means to switch the switchable type transmission mechanism of the vehicular drive system between the continuously-variable shifting state in which the transmission mechanism is operable as the continuously variable transmission and the step-variable shifting state in which the transmission mechanism is operable as the step-variable transmission.

According to a preferred 12$^{th}$ form of this invention according to the 10$^{th}$ form wherein the power distributing mechanism has the first element fixed to the engine, the second element fixed to the first electric motor, and the third element fixed to the second electric motor and the power transmitting member, the operating-state switching device includes a coupling device operable to connect any two of the first through third elements, and/or fix the second element to a stationary member, and the switching control means places the switchable type transmission mechanism in the continuously-variable shifting state by releasing the coupling device to thereby permit the first element, the second element and the third element to be rotated relative to each other, and places the switchable type transmission mechanism in the step-variable shifting state by engaging the coupling device to thereby connect at least two of the first element, the second element and the third element to each other or fix the second element to the stationary member. In this form of the invention, the power distributing mechanism is simply constructed, and is easily switched between the continuously-variable and step-variable shifting states.

According to a preferred 13$^{th}$ form of this invention according to the 12$^{th}$ form, the power distributing mechanism is a planetary gear set, and the first element is a carrier of the planetary gear set, the second element is a sun gear of the planetary gear set, and the third element is a ring gear of the planetary gear set, the coupling device including a clutch operable to connect any two of the carrier, sun gear and ring gear to each other, and/or a brake operable to fix the sun gear to the stationary member. In this form of the invention, the axial dimension of the power distributing mechanism can be reduced, and the power distributing mechanism is simply constituted by one planetary gear set.

According to a preferred 14$^{th}$ form of this invention according to the 13$^{th}$ form, the planetary gear set is of a single-pinion type. According to this arrangement, the axial dimension of the power distributing mechanism can be reduced, and the power distributing mechanism is simply constituted by one planetary gear set.

According to a preferred 15$^{th}$ form of this invention according to the 14$^{th}$ form, the switching control means controls the coupling device to connect the carrier and the sun gear to each other, to thereby enable the planetary gear set of the single-pinion type to operate as a transmission having a speed ratio of 1, or fix the sun gear to the stationary member, to thereby enable the planetary gear set of the single-pinion type to operate as a speed-increasing transmission having a speed ratio lower than 1. According tot his arrangement, the power distributing mechanism constituted by the planetary gear set of the single-pinion type is easily controlled by the switching control means, so as to be selectively operated as a transmission having a single fixed speed ratio or a transmission having a plurality of fixed speed ratios.

According to a preferred 16$^{th}$ form of this invention according to any one of the 11$^{th}$ through 15$^{th}$ forms, the automatic transmission is disposed between the power transmitting member and the drive wheel and connected in series to the power distributing mechanism, and the switchable type transmission mechanism has a speed ratio determined by a speed ratio of the automatic transmission. According to this arrangement, the vehicle drive force can be obtained over a wide range of the speed ratio, by utilizing the speed ratio of the automatic transmission.

According to a preferred 17$^{th}$ form of this invention according to the 16$^{th}$ form, the switchable type transmission mechanism has an overall speed ratio determined by a speed ratio of the power distributing mechanism and the speed ratio of the automatic transmission. According to this arrangement, the vehicle drive force can be obtained over a wide range of the speed ratio, by utilizing the speed ratio of the automatic transmission, so that the efficiency of the continuously-variable shifting control of the power distributing mechanism can be improved. Preferably, the automatic transmission is a step-variable automatic transmission. In this case, the power distributing mechanism and the step-variable automatic transmission cooperate to establish the continuously-variable shifting state in which the switchable type transmission mechanism is operable as a continuously-variable transmission, and the step-variable shifting state in which the transmission mechanism is operable as a step-variable automatic transmission.

According to a preferred 18$^{th}$ form of this invention according to the 16$^{th}$ or 17$^{th}$ form, the automatic transmission is a step-variable automatic transmission which is shifted according to a stored shifting boundary line map. According to this arrangement, the shifting of the step-variable automatic transmission is easily performed.

The switching control means is preferably arranged to place the switchable type transmission mechanism selectively in one of the continuously-variable shifting state and the step-variable shifting state, on the basis of the predetermined condition of the vehicle. According to this arrangement, the drive system has not only an advantage of an improvement in the fuel economy owing to the function of the electrically controlled continuously variable transmission, but also an advantage of high power transmitting efficiency owing to the function of the step-variable transmission capable of mechanically transmitting a vehicle drive force. When the vehicle is in a low- or medium-speed running state, or in a low- or medium-output running state, for example, the switchable type transmission mechanism is placed in the continuously-variable shifting state, so that the fuel economy of the vehicle is improved. When the vehicle is in a high-speed running state, on the other hand, the switchable type transmission mechanism is placed in the step-variable shifting state in which the transmission mechanism is operable as the step-variable transmission, and the output of the engine is transmitted to the drive wheel primarily through a mechanical power transmitting path, so that the fuel economy is improved owing to reduction of a loss of energy conversion between mechanical and electric energies, which would take place when the transmission mechanism is operated as the electrically controlled continuously variable transmission. When the vehicle is in a high-output running state, the switchable type transmission mechanism is placed in the step-variable shifting state. Thus, the transmission mechanism is operated as the electrically controlled continuously variable transmission, only when the vehicle is in the low- or medium-speed running state or in the low- or medium-output running state, so that the required amount of electric, energy generated by the electric motor, that is, the maximum amount of electric energy that must be transmitted from the electric motor can be reduced, making it possible to minimize the required size of the electric motor, and the required size of the drive system including the electric motor.

Preferably, the switchable type transmission mechanism is arranged such that the second electric motor is directly connected to the power transmitting member. According to this arrangement, the required output torque of the second electric motor can be reduced with respect to the torque of the output shaft of the above-described automatic transmission, so that the required size of the second electric motor can be reduced.

BRIEF DESCRIPTION OF THE DRAWINGS

FIG. 1 This figure is a schematic view for explaining an arrangement of a hybrid vehicle drive system according to one embodiment of the present invention.

FIG. 2 This figure is a table indicating shifting actions of the hybrid vehicle drive system of the embodiment of FIG. 1, which is operable in a continuously-variable shifting state and a step-variable shifting state, in relation to different combinations of operating states of hydraulically operated frictional coupling devices to effect the respective shifting actions.

NOMENCLATURE OF ELEMENTS

Figure 3:
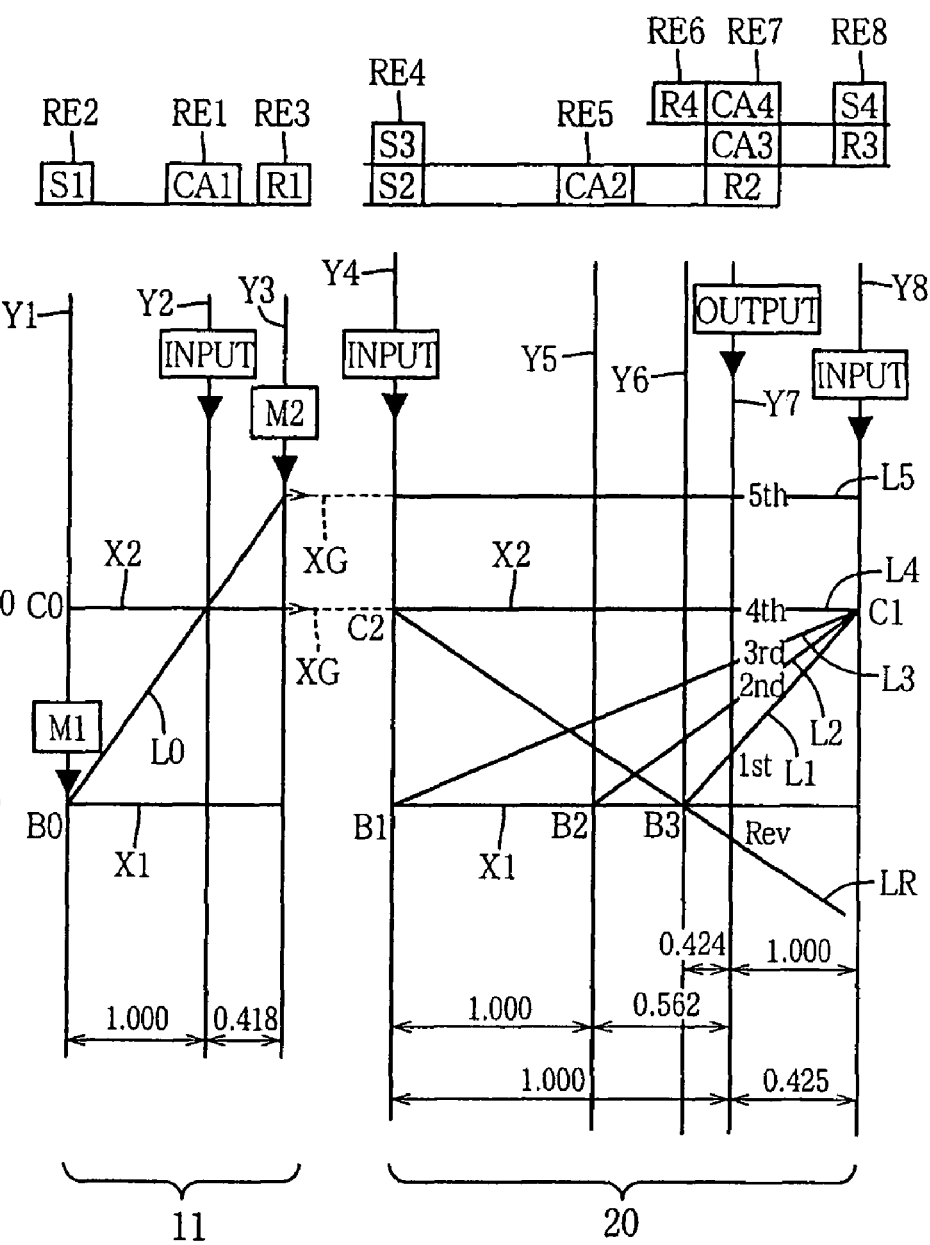
FIG. 3 This figure is a collinear chart showing relative rotating speeds of rotary elements of the hybrid vehicle drive system of the embodiment of FIG. 1 operated in the step-variable shifting state, in different gear positions of the drive system.

8: Engine
10, 70: Switchable type transmission mechanism (Drive system)
12: Transmission casing (stationary member)
16: Power distributing mechanism
18: Power transmitting member
20, 72: Automatic transmission portion (step-variable automatic transmission)
24: First planetary gear set (single-pinion type planetary gear set)
38: Drive wheels
50: Switching control means
54: Step-variable shifting control means (shifting control means)

82: Execution-timing control means
M1: First electric motor
M2: Second electric motor
C0: Switching clutch (operating-state switching device)
B0: Switching brake (operating-state switching device)

BEST MODE FOR CARRYING OUT THE INVENTION

Referring to the drawings, there will be described in detail the embodiments of the present invention.

Embodiment 1

Figure 5:
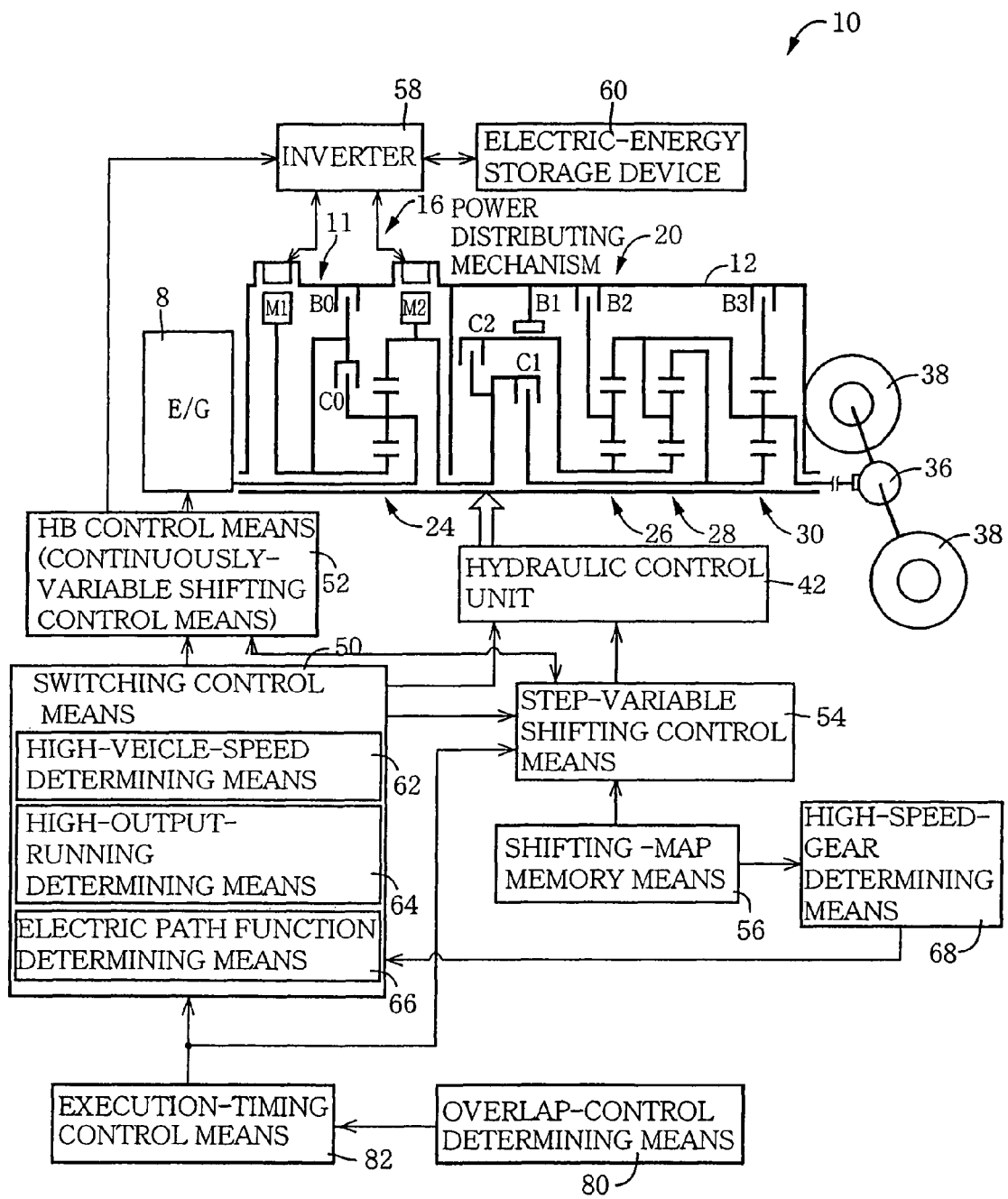
FIG. 5 This figure is a functional block diagram illustrating major control functions performed by the electronic control device of FIG. 4.

FIG. 1 is a schematic view explaining a switchable type transmission mechanism 10 (hereinafter referred to as "transmission mechanism 10") provided as a drive system for a hybrid vehicle, which is controlled by a control device according to one embodiment of this invention. As shown in FIG. 1, the transmission mechanism 10 includes: an input rotary member in the form of an input shaft 14 disposed on a common axis in a transmission casing 12 (hereinafter referred to as "transmission casing 12") functioning as a stationary member attached to a body of the vehicle; a switchable type transmission portion 11 connected to the input shaft 14 either directly, or indirectly via a pulsation absorbing damper (vibration damping device) not shown; a step-variable automatic transmission portion 20 (hereinafter referred to as "automatic transmission portion 20") which functions as an automatic transmission and disposed between the switchable type transmission portion 11 and an output shaft 22 and connected in series to the switchable type transmission portion 11 and the output shaft 22 via a power transmitting member 18 (power transmitting shaft); and an output rotary member in the form of the output shaft 22 connected to the automatic transmission portion 20. The input shaft 12, switchable type transmission portion 11, automatic transmission portion 20 and output shaft 22 are connected in series with each other. This transmission mechanism 10 is suitably used for a transverse FR vehicle (front-engine, rear-drive vehicle), and is disposed between a drive power source in the form of an engine 8 and a pair of drive wheels 38, to transmit a vehicle drive force from the engine 8 to the pair of drive wheels 38 through a differential gear device 36 (final speed reduction gear) and a pair of drive axles, as shown in FIG. 5. It is noted that a lower half of the transmission mechanism 10, which is constructed symmetrically with respect to its axis, is omitted in FIG. 1. This is also true in the other embodiments described below.

The switchable type transmission portion 11 includes: a first electric motor M1; a power distributing mechanism 16 functioning as a mechanism operable to mechanically distribute an output of the engine 8 received by the input shaft 14, to the first electric motor M1 and the power transmitting member 18, or synthesize the output of the engine 8 and an output of the first electric motor M1 and transmit a sum of these outputs to the power transmitting member 18; and a second electric motor M2 the output shaft of which is rotated with the power transmitting member 18. The second electric motor M2 may be disposed at any portion of the power transmitting path between the power transmitting member 18 and the output shaft 22. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as an electric motor operable to produce a vehicle drive force.

The power distributing mechanism 16 includes, as major components, a first planetary gear set 24 of a single pinion type having a gear ratio ρ1 of about 0.418, for example, a switching clutch C0 and a switching brake B1. The first planetary gear set 24 has rotary elements consisting of a first sun gear S1, a first planetary gear P1; a first carrier. CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The switching brake B0 is disposed between the first sun gear S1 and the transmission casing 12, and the switching clutch C0 is disposed between the first sun gear S1 and the first carrier CA1. When the switching clutch C0 and brake B0 are both released, the power distributing mechanism 16 is placed in a so-called continuously-variable shifting state (electrically established CVT state) in which the first sun gear S1, first carrier CA1 and first ring gear R1 are rotatable relative to each other, so that the output of the engine 8 is distributed to the first electric motor M1 and the power transmitting member 18, and a portion of the output of the engine 8 is used to drive the first electric motor M1 to generate an electric energy which is stored or used to drive the second electric motor M2. In this continuously-variable shifting state, the speed of the power transmitting portion 18 is continuously variable irrespective of the speed of the engine 8. Namely, when the power distributing mechanism 16 is placed in the continuously-variable shifting state, the switchable type transmission portion 11 is also placed in the continuously-variable shifting state in which the transmission portion 11 functions as an electrically controlled continuously variable transmission the speed ratio γ0 of which (rotating speed of the input shaft 14/rotating speed of the power transmitting member 18) is continuously variable from a minimum value γ0min to a maximum value γ0max When the switching clutch C0 is engaged during running of the vehicle with an output of the engine 8 in the continuously-variable shifting state of the switchable type transmission portion 11, the first sun gear S1 and the first carrier CA1 are connected together, and the three rotary elements S1, CA1, R1 of the first planetary gear set 24 are rotatable as a unit, so that the power switchable type transmission portion 11 is placed in a fixed-speed-ratio shifting state in which the switchable type transmission portion 11 functions as a transmission having a fixed speed ratio γ0 equal to 1. When the switching brake B0 is engaged in place of the switching clutch C0, the first sun gear S1 is held stationary, and the rotating speed of the first ring gear R1 is made higher than that of the first carrier CA1, so that the switchable type transmission portion 11 is placed in a constant-speed ratio shifting state in which the transmission portion 11 functions as a speed-increasing transmission having a fixed speed ratio γ0 smaller than 1, for example, about 0.7. Thus, the switching clutch C0 and the switching brake B0 function as an operating-state switching device operable to selectively place the switchable type transmission portion 11 selectively in one of the continuously-variable shifting state in which the transmission portion 11 is operable as the continuously variable transmission the speed ratio of which is continuously variable, and a locked state in which the transmission portion 11 is not operable as the continuously variable transmission and its speed ratio is held constant at a fixed value, namely, the fixed-speed-ratio shifting state in which the transmission portion 11 is operable as a transmission having a single gear position with one speed ratio or a plurality of gear positions with respective speed ratios.

The automatic transmission portion 20 includes a single-pinion type second planetary gear set 26, a single-pinion type third planetary gear set 28 and a single-pinion type fourth planetary gear set 30. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the transmission casing 12 through a first brake B1. The second carrier CA2 is selectively fixed to the transmission casing 12 through a second brake B2, and the fourth ring gear R4 is selectively fixed to the transmission casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

The above-described switching clutch C0, first clutch C1, second clutch C2, switching brake B0, first brake B1, second brake B2 and third brake B3 are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C0-C2 and brakes B0-B3 is selectively engaged for connecting two members between which each clutch or brake is interposed.

In the transmission mechanism 10 constructed as described above, one of a first gear position (first speed position) through a fifth gear, position (fifth speed position), a reverse gear position (rear drive position) and a neural position is selectively established by engaging actions of a corresponding combination of the above-described switching clutch C0, first clutch C1, second clutch C2, switching brake B0, first brake B1, second brake B2 and third brake B3, as indicated in the table of FIG. 2. Those positions have respective speed ratios .gamma. (input shaft speed $N_{IN}$/output shaft speed $N_{OUT}$) which change as geometric series. In particular, it is noted that the power distributing mechanism 16 is provided with the switching clutch C0 and brake B0 so that the switchable type transmission portion 11 can be selectively placed by engagement of the switching clutch C0 or switching brake B0, in the fixed-speed-ratio shifting state in which the transmission portion 11 is operable as a transmission the speed ratio of which is held constant, as well as in the continuously-variable shifting state in which the transmission portion 11 is operable as a continuously variable transmission, as described above. In other words, the transmission mechanism 10 is switched to the step-variable shifting state by engaging one of the switching clutch C0 and switching brake B0, and switched to the continuously-variable shifting state by releasing both of the switching clutch C0 and brake B0. The switchable type transmission portion 11 is also considered to be a transmission switchable between the step-variable shifting state and the continuously-variable shifting state.

Where the transmission mechanism 10 functions as the step-variable transmission, for example, the first gear position having the highest speed ratio γ1 of about 3.357, for example, is established by engaging actions of the switching clutch C0, first clutch C1 and third brake B3, and the second gear position having the speed ratio γ2 of about 2.180, for example, which is lower than the speed ratio γ1, is established by engaging actions of the switching clutch C0, first clutch C1 and second, brake B2, as indicated in FIG. 2. Further, the third gear position having the speed ratio γ3 of about 1.424, for example, which is lower than the speed ratio γ2, is established by engaging actions of the switching clutch C0, first clutch C1 and first brake B1, and the fourth gear position having the speed ratio γ4 of about 1.000, for example, which is lower than the speed ratio γ3, is established by engaging actions of the switching clutch C0, first clutch C1 and second clutch C2. The fifth gear position having the speed ratio γ5 of about 0.705, for example, which is smaller than the speed ratio γ4, is established by engaging actions of the first clutch C1, second clutch C2 and switching brake B0. Further, the reverse gear position having the speed ratio γR of about 3.209, for example, which is intermediate between the speed ratios γ1 and γ2, is established by engaging actions of the second clutch C2 and the third brake B3. The neutral position N is established by engaging only the switching clutch C0.

Where the transmission mechanism 10 functions as the continuously-variable transmission, on the other hand, the switching clutch C0 and the switching brake B0 indicated in FIG. 2 are both released, so that the continuously-variable transmission portion 11 functions as the continuously variable transmission, while the automatic transmission portion 20 connected in series to the switchable transmission portion 11 functions as the step-variable transmission, whereby the speed of the rotary motion transmitted to the automatic transmission portion 20 placed in one of the first through fourth gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio γT of the transmission mechanism 10 is continuously variable.

The collinear chart of FIG. 3 indicates, by straight lines, a relationship among the rotating speeds of the rotary elements in each of the gear positions of the transmission mechanism 10, which is constituted by the switchable type transmission portion 11 functioning as the continuously-variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. A lower one of three horizontal lines X1, X2, XG, that is, the horizontal line X1 indicates the rotating speed of 0, while an upper one of the three horizontal lines, that is, the horizontal line X2 indicates the rotating speed of 1.0, that is, an operating speed NE of the engine 8 connected to the input shaft 14. The horizontal line XG indicates the rotating speed of the power transmitting member 18. Three vertical lines Y1, Y2 and Y3 corresponding to the power distributing mechanism 16 of the switchable type transmission portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the automatic transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines Y4-Y8 are determined by the gear ratios ρ2, ρ3 and ρ4 of the second, third and fourth planetary gear sets 26, 28, 30. That is, the distances between the sun gear and carrier of each of the second, third and fourth planetary gear sets 26, 28, corresponds to "1", while the distances between the carrier and ring gear of each of those planetary gear sets 26 28, 30 corresponds to the gear ratio ρ, as indicated in FIG. 3.

Referring to the collinear chart of FIG. 3, the power distributing mechanism 16 of the transmission mechanism 10 is arranged such that the first carrier CA1 which is one of the three rotary elements of the first planetary gear set 24 is integrally fixed to the input shaft 14 and selectively connected to another rotary element in the form of the first sun gear S1 through the switching clutch C0, and this rotary element in the form of the first sun gear S1 is fixed to the first electric motor M1 and selectively fixed to the transmission casing 12 through the switching brake B0, while the third rotary element in the form of the first ring gear R1 is fixed to the power transmitting member 18 and the second electric motor M2, so that a rotary motion of the input shaft 14 is transmitted to the automatic transmission 20 (step-variable transmission portion) through the power transmitting member 18. A relationship between the rotating speeds of the first sun gear S1 and the first ring gear R1 is represented by an inclined straight line L0 which passes a point of intersection between the lines Y2 and X2. When the power distributing mechanism 16 is brought into the continuously-variable shifting state by releasing actions of the switching clutch C0 and brake B0, for instance, the rotating speed of the first sun gear S1 represented by a point of intersection between the line L0 and the vertical line Y1 is raised or lowered by controlling the reaction force generated by an operation of the first electric motor M1 to generate an electric energy, so that the rotating speed of the first ring gear R1 represented by a point of intersection between the line L0 and the vertical line Y3 is lowered or raised. When the switching clutch C0 is engaged, the first sun gear S1 and the first carrier CA1 are connected to each other, and the power distributing mechanism 16 is placed in the non-differential state in which the above-indicated three rotary elements are rotated as a unit, so that the line L0 is aligned with the horizontal line X2, so that the power transmitting member 18 is rotated at a speed equal to the engine speed NE. When the switching brake B0 is engaged, on the other hand, the rotation of the first sun gear S1 is stopped, and the power distributing mechanism 16 is placed in the non-differential state and functions as the speed-increasing mechanism, so that the line L0 is inclined in the state indicated in FIG. 3, whereby the rotating speed of the first ring gear R1, that is, the rotation of the power transmitting member 18 represented by a point of intersection, between the lines L0 and Y3 is made higher than the engine speed NE and transmitted to the automatic transmission portion 20.

When the first clutch C1 and the third brake B3 are engaged, the automatic transmission portion 20 is placed in the first gear position. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as shown in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22. In the first through fourth gear positions in which the switching clutch C0 is placed in the engaged state, the eighth rotary element RE8 is rotated at the same speed as the engine speed NE, with the drive force received from the power distributing mechanism 16. When the switching brake B0 is engaged in place of the switching clutch C0, the eighth rotary element RE8 is rotated at a speed higher than the engine speed NE, with the drive force received from the power distributing mechanism 16. The rotating speed of the output shaft 22 in the fifth gear position established by the engaging actions of the first clutch C1, second clutch C2 and switching brake B0 is represented by a point of intersection between a horizontal line L5 determined by those engaging actions and the vertical line Y7 indicative of the rotating speed of the seventh rotary element RE7 fixed to the output shaft 22.

Figure 4:
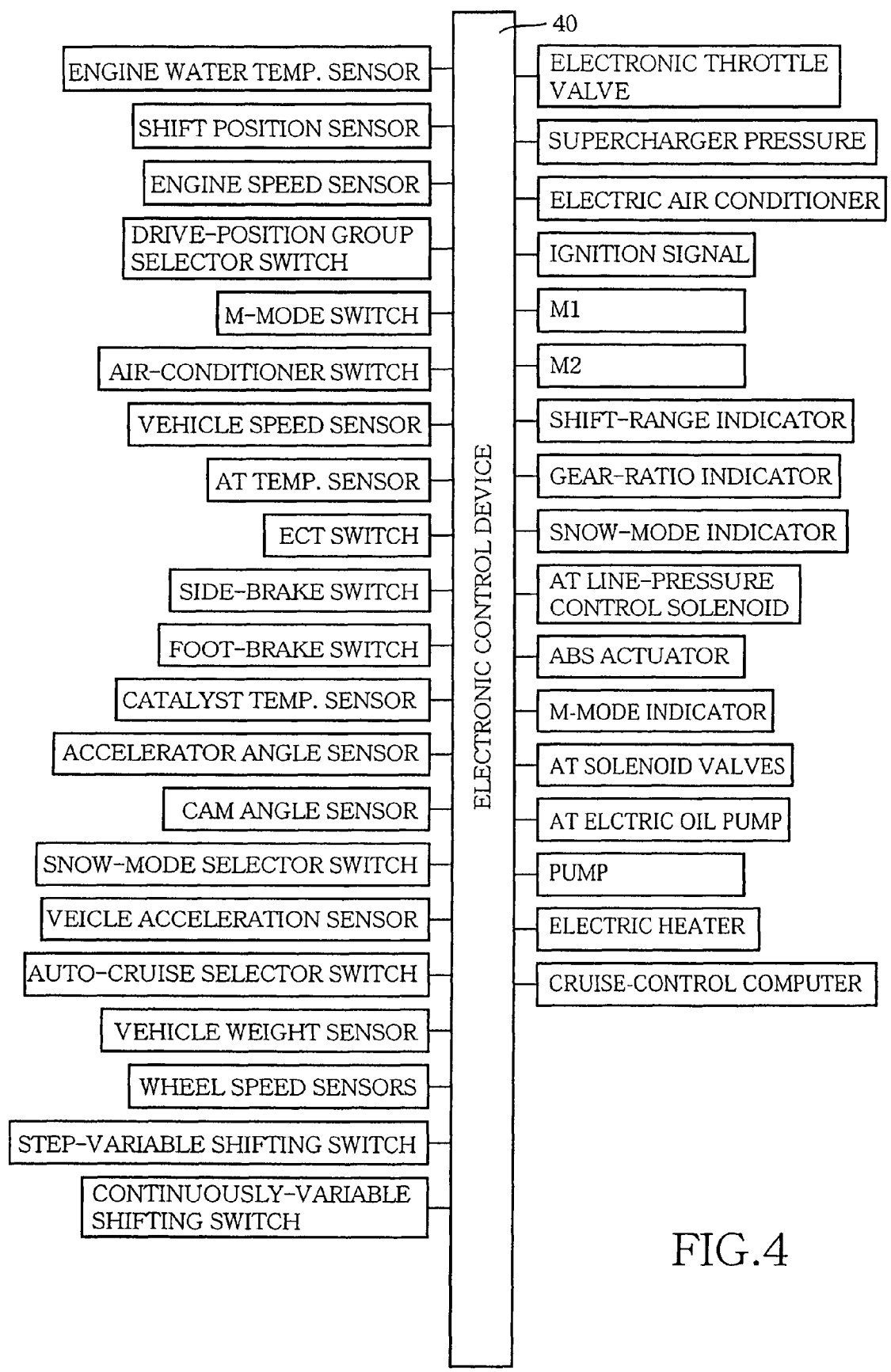
FIG. 4 This figure is a view indicating input and output signals of an electronic control device provided to control the drive system of the embodiment of FIG. 1.

FIG. 4 illustrates signals received by an electronic control device 40 provided to control the transmission mechanism 10, and signals generated by the electronic control device 40. This electronic control device 40 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and electric motors M1 and M2, and drive controls such as shifting controls of the automatic transmission portion 20.

The electronic control device 40 is arranged to receive, from various sensors and switches shown in FIG. 4, various signals such as: a signal indicative of a temperature of cooling water of the engine; an output signal indicative of a presently selected operating position of a shift lever; a signal indicative of the operating speed NE of the engine 8; a signal indicative of a value indicating a selected group of forward-drive positions of the transmission mechanism 10; a signal indicative of an M mode (motor drive mode); a signal indicative of an operated state of an air conditioner; a signal indicative of a vehicle speed corresponding to the rotating speed of the output shaft 22; a signal indicative of a temperature of a working oil of the automatic transmission portion 20; a signal indicative of an operated state of a side brake; a signal indicative of an operated state of a foot brake; a signal indicative of a temperature of a catalyst; a signal indicative of an angle of operation of an accelerator pedal; a signal indicative of an angle of a cam; a signal indicative of the selection of a snow drive mode; a signal indicative of a longitudinal acceleration value of the vehicle; a signal indicative of the selection of an auto-cruising drive mode; a signal indicative of a weight of the vehicle; signals indicative of speeds of the drive wheels of the vehicle; a signal indicative of an operating state of a step-variable shifting switch provided to place the transmission mechanism 10 in the fixed-speed-ratio shifting state in which the transmission mechanism 10 functions as a step-variable transmission; and a signal indicative of a continuously-variable shifting switch provided to place the transmission mechanism 50 in the continuously variable-shifting state in which the transmission mechanism 10 functions as the continuously variable transmission. The electronic control device 40 is further arranged to generate various signals such as: a signal to drive a throttle actuator for controlling an angle of opening of a throttle valve; a signal to adjust a pressure of a supercharger; a signal to operate the electric air conditioner; a signal to control an ignition device for controlling a timing of ignition of the engine 8; signals to operate the electric motors M1 and M2; a signal to operate a shift-range indicator for indicating the selected operating position of the shift lever; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves incorporated in a hydraulic control unit 42 provided to control the hydraulic actuators of hydraulically operated frictional coupling devices of the power distributing mechanism 16 and the automatic transmission portion 20; a signal to operate an electric oil pump used as a hydraulic pressure source for the hydraulic control unit 42; a signal to drive an electric heater; and a signal to be applied to a cruise-control computer.

Figure 6:
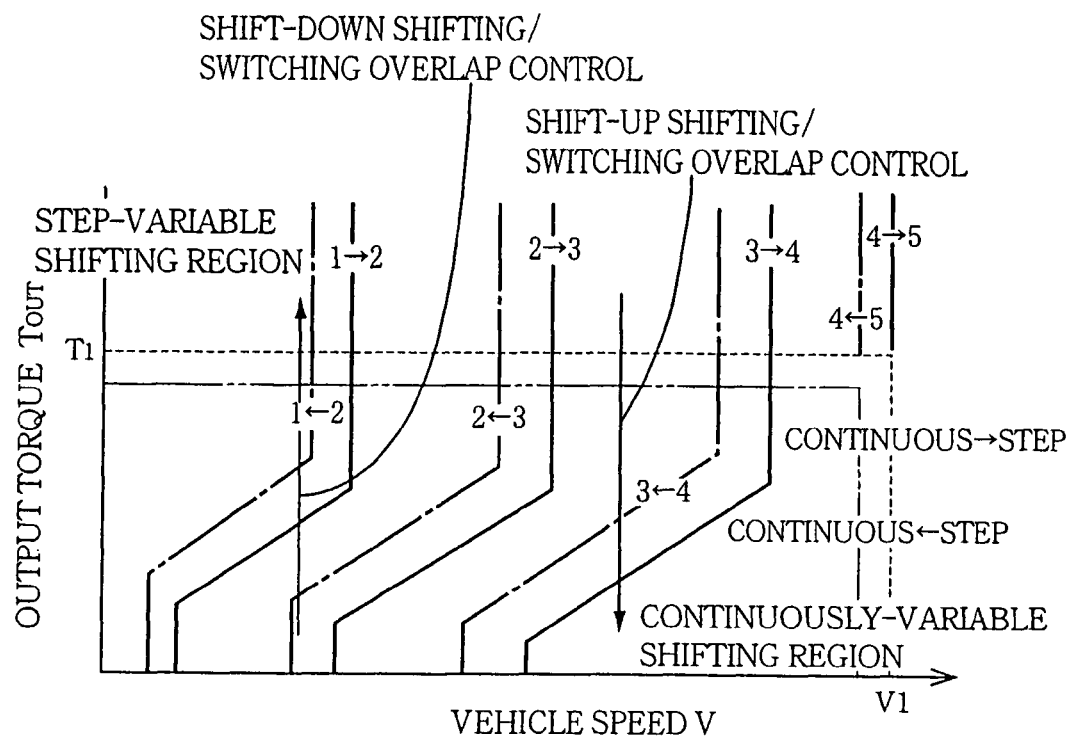
FIG. 6 This figure is a view illustrating a switching operation performed by switching control means of the electronic control device in the embodiment of FIG. 5.

FIG. 5 is a functional block diagram for explaining major control functions performed by the electronic control device 40. As shown in FIG. 5, switching control means 50 includes high-speed-running determining means 62, high-output-running determining means 64, and electric-path-function diagnosing means 66, and is arranged to switch the switchable type transmission mechanism 10 between the continuously-variable shifting state and the step-variable shifting state, on the basis of the predetermined condition of the vehicle. Hybrid control means 52 is arranged to control the engine 8 to be operated with high efficiency, and control the first electric motor M1 and/or the second electric motor M2, so as to optimize a proportion of drive forces generated by the engine 8 and the first electric motor M1 and/or second electric motor M2, for thereby controlling the speed ratio γ0 of the switchable type transmission portion 11 operating as the electrically controlled continuously variable transmission, while the transmission mechanism 10 is placed in the continuously-variable shifting state, that is, while the switchable type transmission portion 11 is placed in the continuously-variable shifting state. Step-variable shifting control means 54 is arranged to determine whether a shifting action of the automatic transmission portion 20 should take place, on the basis of the vehicle condition represented by the vehicle speed V and an output $T_{OUT}$ of the automatic transmission portion 20, and according to a shifting boundary line map which is stored in shifting-map memory means 56 and which is indicated in FIG. 6. The step-variable shifting control means 54 commands the automatic transmission portion 20 to be automatically shifted according to the above-indicated determination.

The high-speed-running determining means 62 indicated above is arranged to determine whether the actual vehicle speed V has reached a predetermined speed value V1, which is an upper limit value above which it is determined that the vehicle is in a high-speed running state. The high-output-running determining means 64 indicated above is arranged to determine whether a drive-force-related value such as the output torque $T_{OUT}$ of the automatic transmission 20, relating to the drive force of the hybrid vehicle, has reached a predetermined output torque value T1, which is an upper limit value above which it is determined that the vehicle is in a high-output running state. The electric-path-function diagnosing means 66 indicated above is arranged to determine whether the components of the transmission mechanism 10 that are operable to establish the continuously-variable shifting state have a deteriorated function. This determination by the diagnosing means 66 is based on the functional deterioration of the components associated with the electric path through which an electric energy generated by the first electric motor M1 is converted into a mechanical energy. For example, the determination is made on the basis of a failure, or a functional deterioration or defect due to a failure or low temperature, of any one of the first electric motor M1, second electric motor M2, inverter 58, electric-energy storage device 60 and electric conductors connecting those components.

The drive-force-related value indicated above is a parameter corresponding to the drive force of the vehicle, which may be the output torque $T_{OUT}$ of the automatic transmission portion 20, an output torque $T_E$ of the engine 8 or an acceleration value of the vehicle, as well as a drive torque or drive force of drive wheels 38. The engine torque Te may be an actual value calculated on the basis of the operating amount of the accelerator pedal or the opening angle of the throttle valve (or intake air quantity, air/fuel ratio or amount of fuel injection) and the engine speed NE, or an estimated value of the engine torque Te or required vehicle drive force which is calculated on the basis of the operating amount of the accelerator pedal by the vehicle operator or the operating angle of the throttle valve. The vehicle drive torque may be calculated on the basis of not only the output torque $T_{OUT}$, etc., but also the ratio of the differential gear device 36 and the radius of the drive wheels 38, or may be directly detected by a torque sensor or the like. Namely, the high-output-running determining means 64 detects the high-output running state of the vehicle, on the basis of the drive-force-related parameters directly or indirectly indicating the vehicle drive force.

The high-speed-gear determining means 68 is arranged to determine whether the gear position to which the transmission mechanism 10 should be shifted on the detected condition of the vehicle and according to the shifting boundary line map stored in the shifting-map memory means 56 and indicated in FIG. 6 is a high-speed-gear position, for example, the fifth gear position. This determination is made to determine which one of the switching clutch C0 and brake B0 should be engaged to place the transmission mechanism 10 in the step-variable shifting state. While the transmission mechanism 10 as a whole is placed in the step-variable shifting state, the switching clutch C0 is engaged to place the transmission mechanism 10 in any of the first-gear position through the fourth-gear position, while the switching brake B0 is engaged to place the transmission mechanism 10 in the fifth-gear position.

The switching control means 50 determines that the vehicle condition is in the step-variable shifting region, in any one of the following predetermined conditions or cases: where the high-speed-running determining means 62 has determined that the vehicle is in the high-speed running state; where the high-output-running determining means 64 has determined that the vehicle is in the high-output running state; and where the electric-path-function diagnosing means 66 has determined that the electric path function is deteriorated. In this case, the switching control means 50 disables the hybrid control means 52 to operate, that is, inhibits the hybrid control means 52 from effecting the hybrid control or continuously-variable shifting control, and commands the step-variable shifting control means 54 to perform predetermined step-variable shifting control operations, for example, an operation to command the automatic transmission 20 to be automatically shifted to the gear position selected according to the shifting boundary line map stored in the shifting-map memory means 56 and indicated in FIG. 6. The table of FIG. 2 indicates the combinations of the operating states of the hydraulically operated frictional coupling devices, namely, C0, C1, C2, B0, B1, B2 and B3, which correspond to the respective gear positions. In this case, therefore, the transmission mechanism 10 as a whole consisting of the switchable type transmission portion 11 and the automatic transmission 20 functions as the so-called step-variable automatic transmission, and performs the automatic shifting actions as indicated in the table of FIG. 2.

Where the high-speed-gear determining means 68 determines that the selected speed is the fifth-gear position, while the high-speed-running determines means 62 determines that the vehicle is in the high-speed running state or while the high-output-running determining means 64 determines that the vehicle is in the high-output running state, the switching control means 50 commands the hydraulic control unit 42 to release the switching clutch C0 and engage the switching brake B0 to enable the switchable type transmission portion 11 to function as an auxiliary transmission having a fixed speed ratio γ0 of 0.7, for example, so that the transmission mechanism 10 as a whole is placed in the high-speed gear position, so-called "overdrive gear position" having a speed ratio lower than 1.0. Where the high-output-running determining means 64 determines that the vehicle is in the high-output running state, and where the high-speed-gear determining means 68 does not determine that the selected gear position is the fifth-gear position, the switching control means 50 commands the hydraulic control unit 42 to engage the switching clutch C0 and release the switching brake B0 to enable the switchable transmission portion 11 to function as an auxiliary transmission having a fixed speed ratio γ0 of 1, for example, so that the transmission mechanism 10 as a whole is placed in a low-gear position having a speed ratio not lower than 1.0. Thus, the switching control means 50 places the transmission mechanism 10 in the step-variable shifting state in any one of the predetermined conditions described above, and selectively places the switchable transmission portion 11 functioning as the auxiliary transmission in the high-gear or low-gear position, while the automatic transmission portion 20 connected in series to the switchable transmission portion 11 is enabled to function as the step-variable transmission, so that the transmission mechanism 10 as a whole functions as the so-called step-variable automatic transmission.

Figure 11:
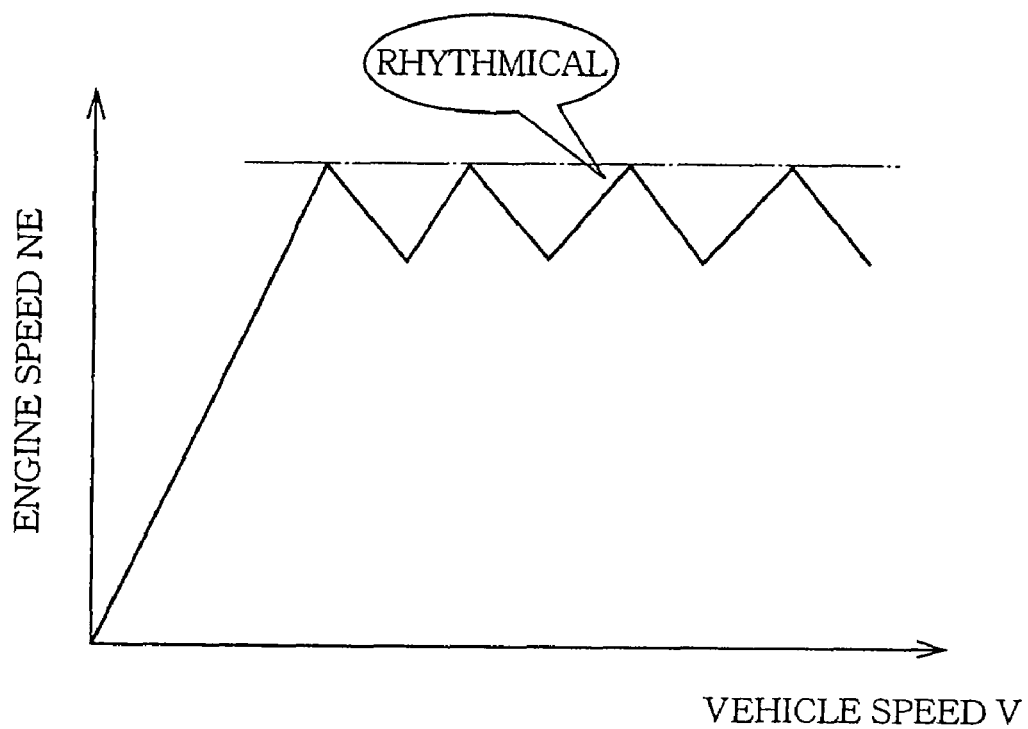
FIG. 11 This figure is a view indicating an example of a change of an engine speed as a result of a shift-up action of the step-variable transmission.

For instance, the upper vehicle-speed limit V1 of the vehicle speed is determined so that the transmission mechanism 10 is placed in the step-variable shifting state while the vehicle speed V is higher than the limit V1. This determination is effective to minimize a possibility of deterioration of the fuel economy of the vehicle if the transmission mechanism 10 were placed in the continuously-variable shifting state at a relatively high running speed of the vehicle. The upper output-torque limit T1 is determined depending upon the operating characteristics of the first electric motor M1, which is small-sized and the maximum electric energy output of which is made relatively small so that the reaction torque of the first electric motor M1 is not so large when the engine output is relatively high in the high-output running state of the vehicle. Alternatively, when the vehicle is in the high-output running state, the transmission mechanism 10 is placed in the step-variable shifting state (fixed-speed-ratio shifting state) rather than the continuously-variable shifting state, so that the engine speed NE changes with a shift-up action of the automatic transmission portion 20, assuring a comfortable rhythmic change of the engine speed NE as the automatic transmission portion 20 is shifted up, as indicated in FIG. 11. In this respect, it is noted that when the engine is in the high-output running state, it is more important to satisfy a vehicle operator's desire to improve the drivability of the vehicle, than a vehicle operator's desire to improve the fuel economy.

However, the switching control means 50 commands the hydraulic control unit 42 to release both of the switching clutch C0 and brake B0 to place the switchable type transmission portion 11 in the continuously-variable shifting state, while the transmission mechanism 10 as a whole is normally operable in its continuously-variable shifting state, that is, when the high-speed-running determining means 62 does not determine that the vehicle is in the high-speed running state, when the high-output-running determining means 64 does not determine that the vehicle is in the high-output running state, and when the electric-path-function diagnosing means 66 does not determine that the electric path function is deteriorated. In this case, the switching control means 50 enables the hybrid control means 52 to effect the hybrid control, and commands the step-variable shifting control means 54 to hold the automatic transmission portion 20 in the predetermined gear position selected for the continuously-variable shifting control, or to permit the automatic transmission portion 20 to be automatically shifted to the gear position selected according to the shifting boundary line map stored in the shifting-map memory means 56 and indicated in FIG. 6. In this case, the automatic transmission portion 20 is automatically shifted under the control of the step-variable shifting control means 50, according to the appropriate one of the combinations of the engaged states of the frictional coupling devices indicated in the table of FIG. 2, except the combination of the engaged states of the switching clutch C0 and brake B0. Thus, in the predetermined condition of the vehicle, the switching control means 50 enables the switchable type transmission portion 11 to operate in the continuously-variable shifting state, functioning as the continuously variable transmission, while the automatic transmission portion 20 connected in series to the switchable type transmission portion 11 functions as the step-variable transmission, so that the drive system provides a sufficient vehicle drive force, such that the speed of the rotary motion transmitted to the automatic transmission portion 20 placed in one of the first-speed, second-speed, third-speed and fourth-gear positions, namely, the rotating speed of the power transmitting member 18 is continuously changed, so that the speed ratio of the drive system when the automatic transmission portion 20 is placed in one of those gear positions is continuously variable over a predetermined range. Accordingly, the speed ratio of the automatic transmission portion 20 is continuously variable across the adjacent gear positions, whereby the overall speed ratio $\gamma T$ of the transmission mechanism 10 is continuously variable.

The hybrid control means 52 controls the engine 8 to be operated with high efficiency, and control the first electric motor M1 and/or second electric motor M2, so as to optimize the proportion of the drive forces generated by the engine 8 and the first electric motor M1 and/or second electric motor M2. For instance, the hybrid control means 52 calculates the output as required by the vehicle operator at the present running speed of, the vehicle, on the basis of the operating amount of the accelerator pedal and the vehicle running speed, and calculate a required vehicle drive force on the basis of the calculated required output and a required amount of generation of an electric energy by the electric motor. On the basis of the calculated required vehicle drive force, the hybrid control means 52 calculates desired speed NE and total output of the engine 8, and controls the actual output of the engine 8 and the amount of generation of the electric energy by the electric motor, according to the calculated desired speed NE and total output of the engine 8. The hybrid control means 52 is arranged to effect the above-described hybrid control while taking account of the presently selected gear position of the automatic transmission portion 20, so as to improve the drivability of the vehicle and the fuel economy of the engine 8. In the hybrid control, the switchable type transmission portion 11 is controlled to function as the electrically controlled continuously-variable transmission, for optimum coordination of the engine speed NE and vehicle speed V for efficient operation of the engine 8, and the rotating speed of the power transmitting member 18 determined by the selected gear position of the automatic transmission portion 20. That is, the hybrid control means 52 determines a target value of the overall speed ratio $\gamma T$ of the transmission mechanism 10, so that the engine 8 is operated according to a stored highest-fuel-economy curve. The stored highest-fuel-economy curve satisfies both of the desired operating efficiency and the highest fuel economy of the engine 8. The hybrid control means 52 controls the speed ratio $\gamma 0$ of the switchable transmission portion 11, so as to obtain the target value of the overall speed ratio $\gamma T$, so that the overall speed ratio $\gamma T$ can be controlled within a predetermined range, for example, between 13 and 0.5.

In the hybrid control, the hybrid control means 52 controls an inverter 58 such that the electric energy generated by the first electric motor M1 is supplied to the electric-energy storage device 60 and the second electric motor M2 through the inverter 58, so that a major portion of the drive force produced by the engine 8 is mechanically transmitted to the power transmitting member 18, while the remaining portion of the drive force is consumed by the first electric motor M1 to convert this portion into the electric energy, which is supplied through the inverter 58 to the second electric motor M2 or the first electric motor M1, so that the second electric motor M2 or first electric motor M1 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy. It is also noted that the hybrid control means 52 is capable of establishing a motor drive mode in which the vehicle is by the electric motor used as the drive power source, by utilizing the electric CVT function of the switchable type transmission portion 11, irrespective of whether the engine 8 is in the non-operated state or in the idling state.

FIG. 6 shows an example of the shifting boundary line map (relationship) which is stored in the shifting-map memory means 56 and which is used for determining whether the automatic transmission portion 20 should be shifted. This shifting boundary line map is defined in a rectangular two-dimensional coordinate system having two axes corresponding to respective parameters, namely, the vehicle speed V and a drive-force-related value in the form of the output torque Tour of the automatic transmission portion 20. In FIG. 6, solid lines are shift-up boundary lines, and one-dot chain lines are shift-down boundary lines. Broken lines in FIG. 6 are boundary lines defining a step-variable shifting region and a continuously-variable shifting region which are used by the switching control means 50. These boundary lines represent the upper vehicle-speed limit V1 and the upper output-torque limit T1, and respectively serve as a high-speed-running boundary line for determining whether the vehicle condition is in a high-speed running state, and a high-output-running boundary line for determining whether the vehicle condition is in a high-output running state. FIG. 6 also shows two-dot chain lines which are boundary line offset with respect to the broken lines, by a suitable amount of control hysteresis, so that the broken lines and the two-dot chain lines are selectively used as the boundary lines. Thus, FIG. 6 also shows a stored switching boundary line map (relationship) used by the switching control means 50 to determine whether the vehicle is in the step-variable shifting state or the continuously-variable shifting state, depending upon whether the vehicle speed V and the output torque Tour are higher than the predetermined upper limit values V1, T1. Therefore, the vehicle condition may be determined according to this switching boundary line map and on the basis of the actual values of the vehicle speed V and output torque $T_{OUT}$. This switching boundary line map as well as the shifting boundary line map may be stored in the shifting-map memory means 56. The switching boundary line map may include at least one of the boundary lines representative of the upper vehicle-speed limit V1 and the upper output-torque limit T1, and may use only one of the two parameters V and $T_{OUT}$. The shifting boundary line map and the switching boundary line may be replaced by stored equations for comparison of the actual vehicle speed V with the limit value V1 and comparison of the actual output torque $T_{OUT}$ with the limit value T1.

Figure 7:
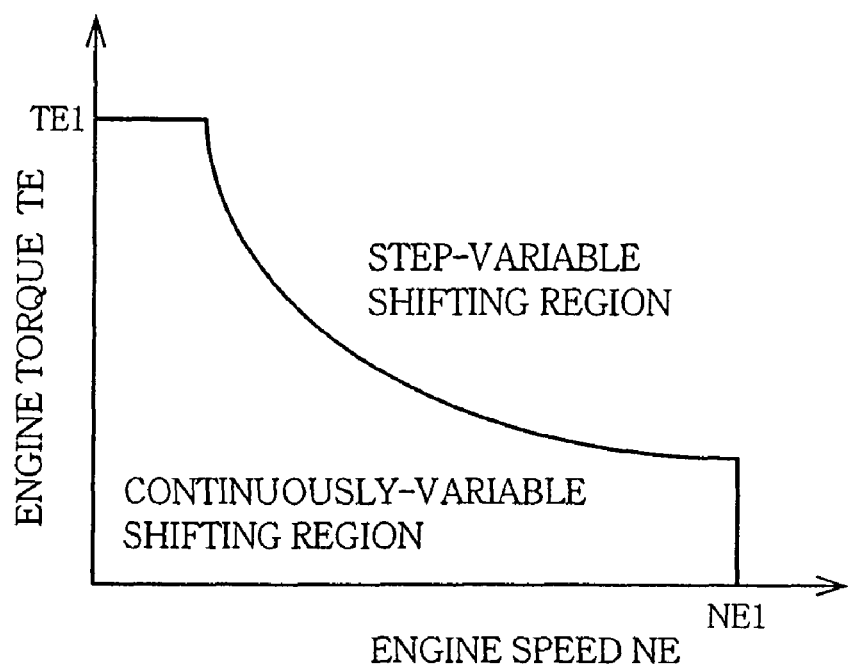
FIG. 7 This figure is a view indicating a stored relationship representing boundary lines defining a continuously-variable shifting region and a step-variable shifting region, which is used for mapping boundary lines which are indicated by broke lines in FIG. 6 and which define the continuously-variable shifting region and the step-variable shifting region.

The switching boundary lines indicated by the broken lines in FIG. 6, which are superimposed on the shifting boundary line map for the automatic transmission portion 20, are based on a stored shifting-region switching map (relationship) indicated in FIG. 7, which represents boundary lines defining the step-variable shifting region and continuously-variable shifting region in a two-dimensional coordinate system having two axes corresponding to respective parameters in the form of the engine speed NE and the engine torque TE. In other words, the switching boundary line map of FIG. 6 is obtained on the basis of the shifting-region switching map of FIG. 7. The switching control means 50 may use the shifting-region switching map of FIG. 7 in place of the switching boundary line map of FIG. 6, to determine whether the detected vehicle condition is in the continuously-variable or step-variable shifting region.

The step-variable shifting region defined by the switching boundary line map of FIG. 6 is defined as a high-torque region in which the output torque $T_{OUT}$ is not lower than the predetermined upper limit T1, or a high-speed region in which the vehicle speed V is not lower than the predetermined upper limit $V_1$. Accordingly, the step-variable shifting control is effected when the torque TE of the engine 8 is comparatively high or when the vehicle speed V is comparatively high, while the continuously-variable shifting control is effected when the torque TE of the engine 8 is comparatively low or when the vehicle speed V is comparatively low, that is, when the engine 8 is in a normal output state. Similarly, the step-variable shifting region defined by the shifting-region switching map of FIG. 7 is defined as a high-torque region in which the engine torque TE is not lower than the predetermined upper limit TE1, or a high-speed region in, which the engine speed NE is not lower than the predetermined upper limit NE1, or alternatively defined as a high-output region in which the output of the engine 8 calculated on the basis of the engine torque TE and speed NE is not lower than a predetermined limit. Accordingly, the step-variable shifting control is effected when the torque TEE, speed NE or output of the engine 8 is comparatively high, while the continuously-variable shifting control is effected when the torque TEE, speed NE or output of the engine 8 is comparatively low, that is, when the engine 8 is in the normal output state. The boundary lines of the shifting-region switching map of FIG. 7 may be considered as high-speed threshold lines or high-engine-output threshold lines, which define upper limit of the vehicle speed V or engine output.

Overlap-control determining means 80 is arranged to determine whether a switching control of the transmission mechanism 10 or the switchable type transmission portion 11 to be executed by the switching control means 50 and a shifting control of the automatic transmission portion 20 to be executed by the step-variable shifting control means 54 overlap each other. This determination is made by determining whether the vehicle condition requires the switching control means 50 to switch the shifting state of the transmission portion 10 and at the same time requires the step-variable shifting control means 54 to shift the automatic transmission portion 20. In the present application, the switching control by the switching control means 50 and the shifting control by the step-variable shifting control means 54 which overlap each other are referred to as an "overlap control", which means not only the switching and shifting controls that are initiated simultaneously, but also the switching and shifting controls that at least partially overlap each other in their processes.

In FIG. 6, an upward arrow-headed line indicates an example of an overlap control wherein a switching action overlaps a shift-down shifting action, while a downward arrow-headed line indicates an example of an overlap control wherein a switching action overlaps a shift-up shifting action. In the figure, "$T_{OUT}$" represents a required output torque of the vehicle calculated on the basis of the amount of operation of the accelerator pedal by the vehicle operator. Described in detail, the upward arrow-head line in FIG. 6 indicates an overlap control wherein a switching action of the transmission mechanism 10 from the continuously-variable shifting state to the step-variable shifting state and a shift-down shifting action of the automatic transmission portion 20 from the third gear position to the first gear position take place simultaneously in response to a depressing operation of the accelerator pedal. In other words, the upward arrow-headed line indicates determination by the high-output-running determining means 64 of a change of the vehicle condition from the continuously-variable shifting region to the step-variable shifting region, and simultaneous determination by the step-variable shifting control means 54 of a movement of a point representative of the vehicle condition across a 3-2 shift-down boundary line and a 2-1 shift-down boundary line, which movement requires the automatic transmission portion 20 to be shifted down from the third gear position to the first gear position. On the other hand, the downward arrow-headed line in FIG. 6 indicates an overlap control wherein a switching action of the transmission mechanism 10 from the step-variable shifting state to the continuously-variable shifting state and a shift-up shifting action of the automatic transmission portion 20 from the third gear position to the fourth gear position take place simultaneously in response to a releasing operation of the accelerator pedal. In other words, the downward arrow-headed line indicates determination of a change of the vehicle condition from the step-variable shifting region to the continuously-variable shifting region together with negative determinations by the high-vehicle-speed determining means 62, high-output-running determining means 64 and electric-path-function determining means 66, and simultaneous determination by the step-variable shifting control means 54 of a movement of the point representative of the vehicle condition across a 3-4 shift-up boundary line, which movement requires the automatic transmission portion 20 to be shifted up from the third gear position to the fourth gear position. The switching control by the switching control means 50 and the shift-down shifting control by the step-variable shifting control means 54 which overlap each other is referred to as "shift-down shifting/switching overlap control", while the switching control by the switching control means 50 and the shift-up shifting control by the step-variable shifting control means 54 is referred to as "shift-up shifting/switching overlap control". The overlap-control determining means 80 is arranged to determine that the shift-down shifting/switching overlap control is required, when the vehicle condition has changed as indicated by the upward arrow-headed line in FIG. 6, and determine that the shift-up shifting/switching overlap control is required, when the vehicle condition has changed as indicated by the downward arrow-headed line in FIG. 6.

As described above, the overlap control is required as a result of a change of the vehicle condition which is represented by the vehicle speed V and the required output torque Tour calculated on the basis of the operating amount of the accelerator pedal, for example, as indicated in FIG. 6. It will be understood from FIG. 6 that the overlap control is required, in particular, as a result of a change of the operating amount of the accelerator pedal, that is, as a result of a change of the required output torque $T_{OUT}$. The operating amount of the accelerator pedal may be replaced by any other drive-force-related value such as the angle of opening of the throttle valve.

Execution-timing control means 82 is arranged to command the switching control means 50 and the step-variable shifting control means 54 to sequentially execute a switching control of the shifting state of the transmission mechanism 10 and a shifting control of the automatic transmission portion 20, in a predetermined order, so as to prevent overlapping of the switching control and the shifting control, when the overlap-control determining means 80 has determined an overlap control wherein the switching and shifting controls overlap each other. Namely, the execution-timing control means 82 is arranged to effect a so-called "sequential control" in which one of the switching control means 50 and the step-variable shifting control means 54 is first commanded to execute a corresponding one of the switching and shifting controls, and the other of the switching and shifting control means 50, 54 is then commanded to execute the other of the switching and shifting controls after completion of the above-indicated one control. This arrangement of the execution-timing control means 82 prevents actual execution of the overlap control, and permits the switching control and the shifting control to be rapidly completed. Since the switching control is not executed during execution of the shifting control, the output speed of the switchable type transmission portion 11 or the input speed of the automatic transmission portion 20, that is, the speed of the power transmitting member 18 will not change due to the switching control, apart from a change of the input speed of the automatic transmission portion 20 as a result of its shifting control, making it possible to prevent the complicated shifting control and reduce the consequent shifting shock of the automatic transmission portion. The predetermined order in which the switching control and the shifting control are sequentially executed in the sequential control will be described in detail.

In one mode of control operation of the execution-timing control means 82, the switching control to change the shifting state of the transmission mechanism 10 under the control of the switching control means 50 is always executed first. In this mode of control operation, the automatic transmission portion 20 is shifted under the control of the step-variable shifting control means 54 after the transmission mechanism 10 is switched from the continuously-variable, shifting state to the step-variable shifting state, for example, under the control of the switching control means 50. Accordingly, the shifting action of the automatic transmission portion 20 takes place only after the speed of the power transmitting member 18 relative to the engine speed NE is held constant with the switchable type transmission portion 11 already placed in the step-variable shifting state (fixed-speed-ratio shifting state), that is, only after the input speed of the automatic transmission portion 20 has been stabilized. The sequential control in this mode permits rapid completion of the shifting control, with reduced control complexity and reduced consequent shifting shock of the automatic transmission portion, as compared with the overlap control. Where the automatic transmission portion 20 is shifted under the control of the step-variable shifting control means 54 after the transmission mechanism 10 is switched from the step-variable shifting state to the continuously-variable shifting state under the control of the switching control means 50, the input speed of the automatic transmission portion 20, that is, the speed of the power transmitting member 18 is rapidly changed by the switchable type transmission portion 11 placed in the continuously-variable shifting state before the shifting action of the automatic transmission portion 20, so that the shifting action can be rapidly completed, with a reduced amount of the shifting shock.

In another mode of control operation of the execution-timing control means 82, the shifting control by the step-variable shifting control means 54 is always executed first. In this mode of control operation, the transmission mechanism 10 is switched from the step-variable shifting state to the continuously-variable state, for example, under the control of the switching control means 50 after the automatic transmission portion 20 is shifted under the control of the step-variable shifting control means 54 in the step-variable shifting state of the transmission mechanism 10. Accordingly, the shifting action of the automatic transmission portion 20 takes place while the speed of the power transmitting member 18 relative to the engine speed NE is held constant with the switchable type transmission portion 11 maintained in the step-variable shifting state, that is, while the input speed of the automatic transmission portion 20 is held stable. The sequential control in this mode permits rapid completion of the shifting control, with reduced control complexity and reduced consequent shifting shock of the automatic transmission portion, as compared with the overlap control. Where the transmission mechanism 10 is switched from the continuously-variable shifting state to the step-variable shifting state under the control of the switching control means 50 after the automatic transmission portion 20 is shifted under the control of the step-variable shifting control means 54, the input speed of the automatic transmission portion 20, that is, the speed of the power transmitting member 18 is rapidly changed by switchable type transmission portion 11 maintained in the continuously-variable shifting state, in the process of the shifting action of the automatic transmission portion 20, so that the shifting action of the automatic transmission portion 20 can be rapidly completed, with a reduced amount of the shifting shock.

In a further mode of control operation of the execution-timing control means 82, the order in which the switching control of the transmission mechanism 10 by the switching control means 50 and the shifting control of the automatic transmission portion 20 by the step-variable shifting control means 54 are sequentially executed is determined on the basis of the vehicle condition, and these switching and shifting controls are executed in the determined order. Where the shift-up shifting/switching overlap control is required as a result of a change of the vehicle condition caused by the releasing action of the accelerator pedal, as indicated by the downward arrow-headed line in FIG. 6, for example, the execution-timing control means 82 commands the step-variable shifting control means 54 to shift up the automatic transmission portion 20 while the transmission mechanism 10 is maintained in the step-variable shifting state. Like the above-described modes of control operation, this mode of control operation reduces the shifting shock of the automatic transmission portion 20. When the shift-up shifting/switching overlap control is required, however, the execution-timing control means 82 may command the switching control means 50 to switch the transmission mechanism 10 to the continuously-variable shifting state before the shift-up action. In this case, too, the shifting shock of the automatic transmission portion 20 is reduced. Where the shift-down shifting/switching overlap control is required as a result of a change of the vehicle condition caused by the depressing operation of the accelerator pedal, as indicated by the upward arrow-headed line in FIG. 6, the execution-timing control means 82 commands the switching control means 50 to switch the transmission mechanism 10 to the step-variable shifting state before the shift-down action, in view of a possibility that the amount of electric energy generated by the first electric motor M1 when it is relatively small-sized is not sufficient to be comparable with a high output range of the engine. In this case, it is considered that the execution-timing control means 82 is arranged to change the predetermined order of execution of the switching control of the transmission mechanism 10 by the switching control means 50 and the shifting control of the automatic transmission portion 20 by the step-variable shifting control means 54, on the basis of a change of the vehicle condition. In this case, too, the shifting shock of the automatic transmission portion 20 is reduced. Where the capacity of the first electric motor M1 is comparable with a high-output range of the engine, the execution-timing control means 82 may command the step-variable shifting control means 54 to shift-down the automatic transmission 20 while the transmission mechanism 10 is maintained in the continuously-variable shifting state. In this case, too, the shifting shock of the automatic transmission portion 20 is reduced. Thus, the overlap control is required when the transmission mechanism 10 is required to be switched from the step-variable shifting state to the continuously-variable shifting state in response to a reduction of the required output torque Tour as a result of the releasing operation of the accelerator pedal, or when the transmission mechanism 10 is required to be switched from the continuously-variable shifting state to the step-variable shifting state in response to an increase of the required output torque $T_{OUT}$ as a result of the depressing operation of the accelerator pedal. Upon determination of requirement for the overlap control, therefore, the execution-timing control means 82 determines the order of execution of the switching control of the transmission mechanism 10 by the switching control means 50 and the shifting control of the automatic transmission portion 20 by the step-variable shifting control means 53, on the basis of the vehicle condition as represented by the operating amount of the accelerator pedal. The vehicle condition may be represented by a drive-force-related value other than the operating amount of the accelerator pedal, such as the angle of opening of the throttle valve, or by any other parameter such as the vehicle speed V and the temperature of the hydraulic working fluid.

In a still further mode of control operation of the execution-timing control means 82, the order in which the switching control of the transmission mechanism 10 by the switching control means 50 and the shifting control of the automatic transmission portion 20 by the step-variable shifting control means 52 are sequentially executed is determined on the basis of the presently established shifting state of the transmission mechanism 10, that is, whether the continuously-variable shifting state or the step-variable shifting state is presently established. The switching and shifting controls are executed in the determined order. When the transmission mechanism 10 is presently placed in the continuously-variable shifting state, for example, the execution-timing control means 82 commands the switching control means 50 to switch the transmission mechanism from the continuously-variable shifting state to the step-variable shifting state before the shifting control. When the transmission mechanism 10 is presently placed in the step-variable shifting state, the execution-timing control means 82 commands the step-variable shifting control means 54 to execute the shifting control before the switching control. In these cases, the automatic transmission portion 20 is shifted while the transmission mechanism 10 is placed in the step-variable shifting state, so that the shifting shock of the automatic transmission portion 20 is reduced, as in the above-described modes of control operation. When the transmission mechanism 10 is presently placed in the continuously-variable shifting state, the execution-timing control means 82 may command the step-variable shifting control means 54 to execute the shifting control before the switching control. When the transmission mechanism 10 is presently placed in the step-variable shifting state, the execution-timing control means 82 may command the switching control means 50 to switch the transmission mechanism 10 from the step-variable shifting state to the continuously-variable shifting state before the shifting control. In these cases, the shifting control of the automatic transmission portion 20 is executed while the transmission mechanism 10 is placed in the continuously-variable shifting state, so that the shifting shock of the automatic transmission portion 20 is reduced.

In a yet further mode of control operation of the execution-timing control means 82, the order in which the switching control of the transmission mechanism 10 by the switching control means 50 and the shifting control of the automatic transmission portion 20 by the step-variable shifting control means 54 are sequentially executed in the predetermined order is determined on the basis of the shifting state to which the transmission mechanism 10 is to be switched, that is, whether the transmission mechanism 10 is to be switched to the continuously-variable shifting state or the step-variable shifting state. The switching and shifting controls are executed in the predetermined order. When the transmission mechanism 10 is to be switched to the continuously-variable shifting state, for example, the execution-timing control means 82 commands the step-variable shifting control means 54 to execute the shifting control before the switching control. When the transmission mechanism 10 is to be switched to the step-variable shifting state, the execution-timing control means 82 commands the switching control means 50 to switch the transmission mechanism 10 from the continuously-variable shifting state to the step-variable shifting state before the shifting control. In these case, the shifting control is executed after the transmission mechanism 10 is switched to the step-variable shifting state, so that the shifting shock of the automatic transmission 20 is reduced. When the transmission mechanism 10 is to be shifted to the continuously-variable shifting state, the execution-timing control means 82 may command the switching control means 50 to switch the transmission mechanism 10 from the step-variable shifting state to the continuously-variable shifting state before the shifting control. When the transmission mechanism 10 is to be shifted to the step-variable shifting state, the execution-timing control means 82 may command the step-variable shifting control means 54 to execute the shifting control before the switching control. In these cases, too, the shifting control of the automatic transmission 20 is executed while the transmission mechanism 10 is placed in the continuously-variable shifting state, so that the shifting shock of the automatic transmission portion 20 is reduced.

In still another mode of control operation of the execution-timing control means 82, one of the switching control by the switching control means 50 and the shifting control by the step-variable shifting control means 50 which has already been initiated is completed before the other of the switching and shifting controls is initiated. In this mode of control operation, too, the switching control by the switching control means 50 and the shifting control by the step-variable shifting control means 54 are sequentially executed, so that the shifting shock of the automatic transmission portion 20 is reduced.

Figure 8:
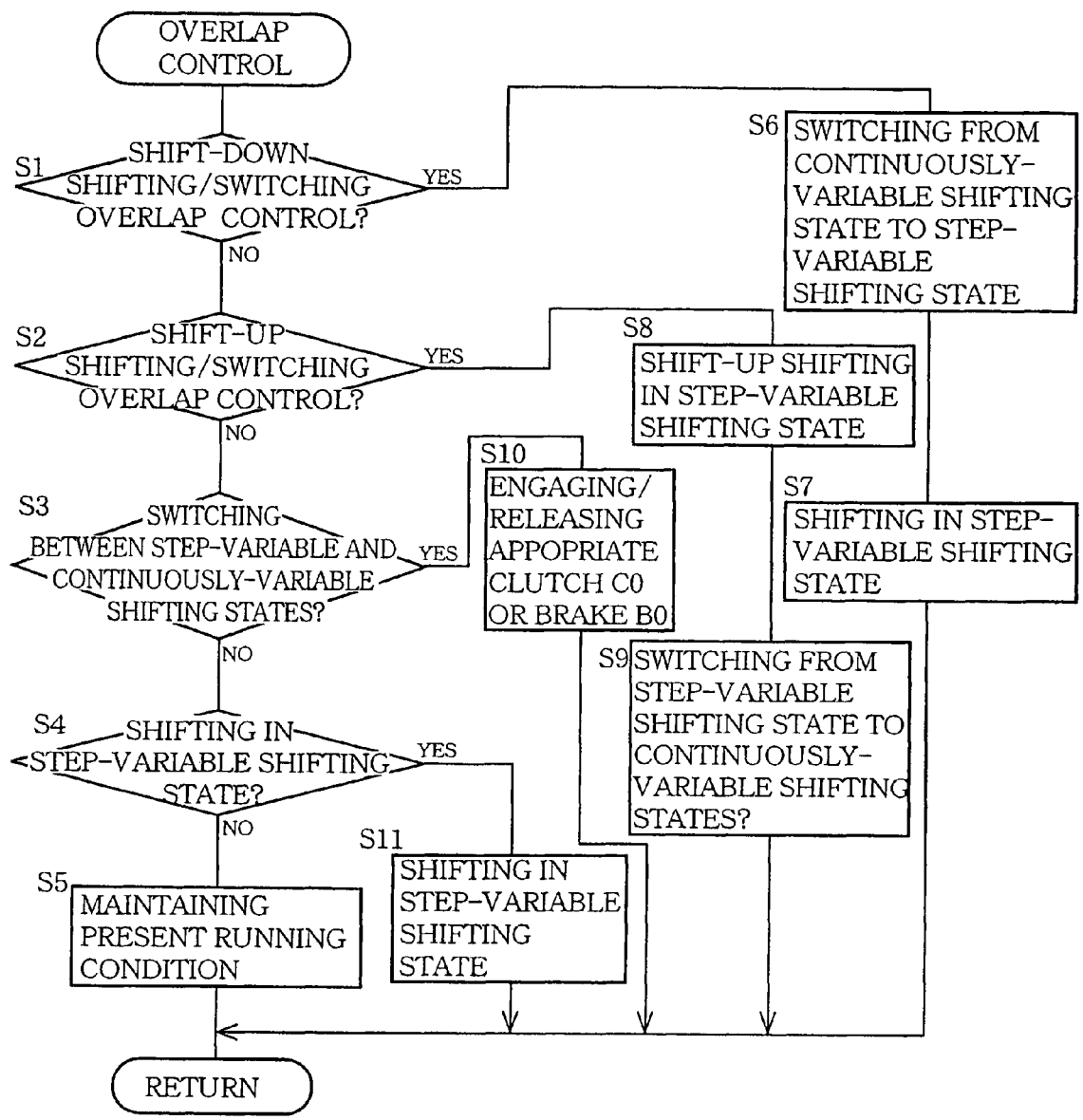
FIG. 8 This figure is a flow chart illustrating a major control operation performed by the electronic control device of FIG. 4.
Figure 9:
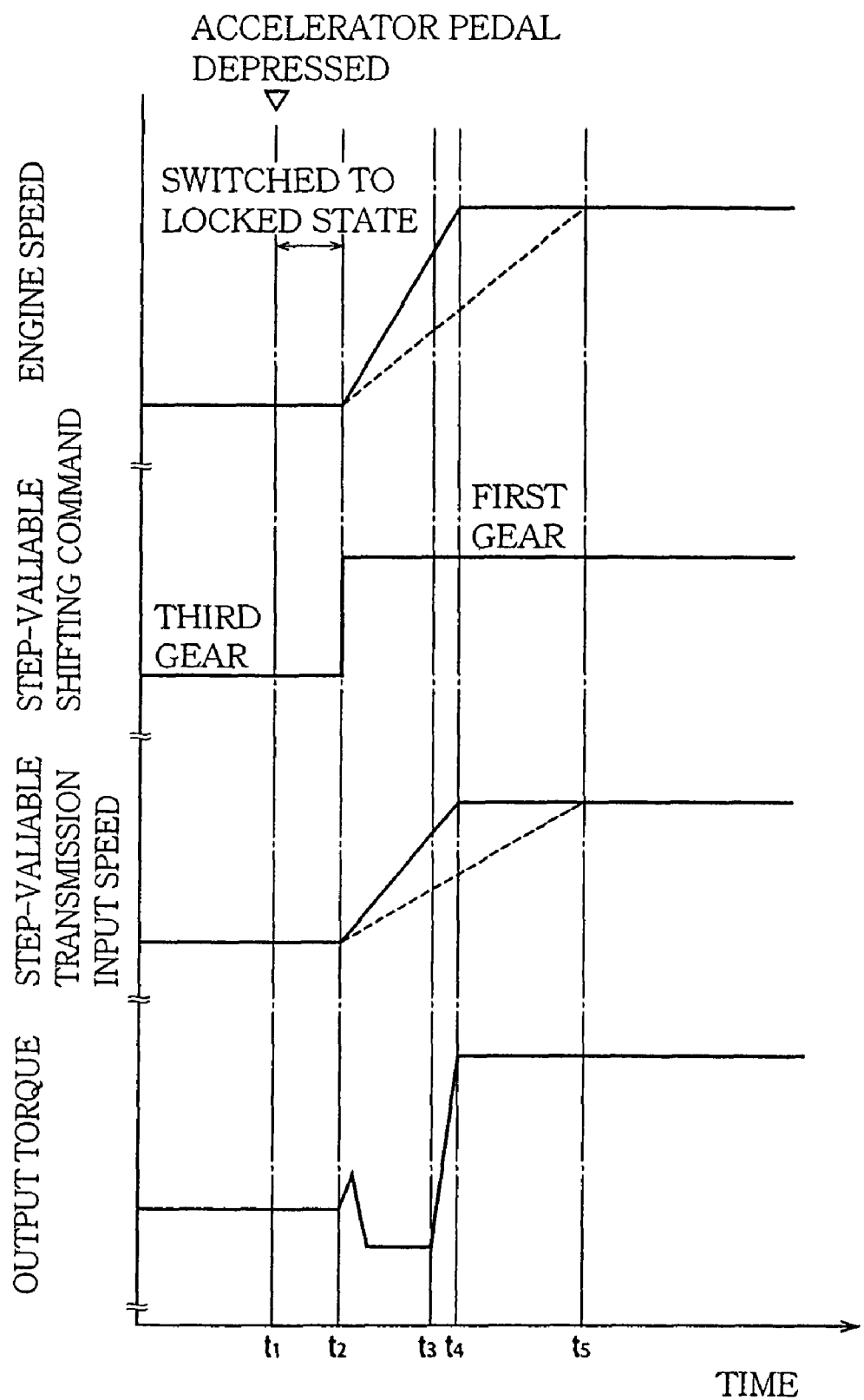
FIG. 9 This figure is a time chart for explaining the control operation of FIG. 8 performed when the transmission mechanism is switched from the continuously-variable shifting state to the step-variable shifting state while a step-variable transmission of the drive system is shifted down from a third gear position to a first gear position.

FIG. 8 is the flow chart illustrating major control operations which are performed by the electronic control device 40, with an extremely short cycle time of about several microseconds to several tens of microseconds. FIG. 9 is the time chart for explaining the control operations when the 3-1 shift-down shifting/switching overlap control is required, while FIG. 10 is the time chart for explaining the control operations when the 3-4 shift-up shifting/switching overlap control is required.

Initially, steps S1 and S2 ("step" being hereinafter omitted) corresponding to the overlap-control determining means 80 are implemented to determine whether an overlap control involving the switching control of the transmission mechanism 10 by the switching control means 50 and the shifting control of the automatic transmission portion 20 by the step-variable shifting control means 54 is required. For example, S1 is arranged to determine whether the shift-down shifting/switching overlap control is required as a result of a change of the vehicle condition caused by a change of the operating amount of the accelerator pedal, and S2 is arranged to determine whether the shift-up shifting/switching overlap control is required as a result of a change of the vehicle condition caused by a change of the operating amount of the accelerator pedal. An affirmative decision is obtained in S1 when the vehicle condition is changed as indicated by the upward arrow-headed line in FIG. 6, and an affirmative decision is obtained in S2 when the vehicle condition is changed as indicated by the downward arrow-headed line in FIG. 6.

Figure 10:
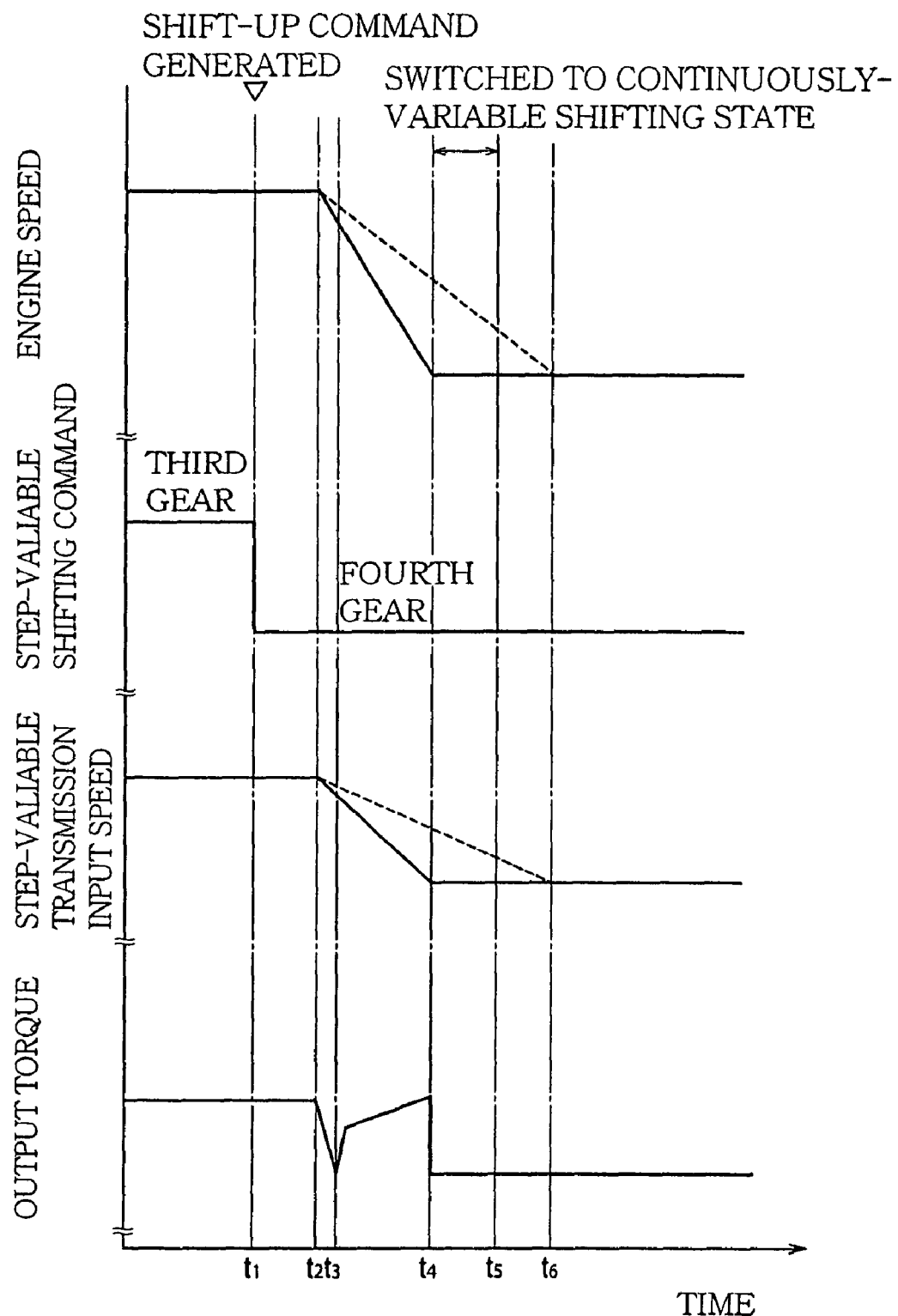
FIG. 10 This figure is a time chart for explaining the control operation of FIG. 8 performed when the transmission mechanism is switched from the step-variable shifting state to the continuously-variable shifting state while the step-variable transmission is shifted up from the third gear position to a fourth gear position.

When the affirmative decision is obtained in S1, S6 corresponding to the switching control means 50 is implemented to switch the transmission mechanism 10 from the continuously-variable shifting state to the step-variable shifting state indicated as "LOCKED STATE" in FIG. 9, during a time period from a point of time t1 to a point of time t2. For switching to this step-variable shifting state, the switching clutch C0 is engaged since the automatic transmission portion 20 is subsequently shifted to the first gear position or since the required output torque $T_{OUT}$ is larger than the upper limit T1. As a result, the input speed of the automatic transmission portion 20 is fixed at the engine speed NE. At this time, however, the engine speed NE may be changed by the first electric motor M1 or the second electric motor M2. Subsequently, S7 corresponding to the step-variable shifting control means 54 is implemented to shift down the automatic transmission portion 20 to the first gear position, according to the table of FIG. 2, during a time period from the point of time t2 to a point of time t4 indicated in FIG. 9. Thus, the overlap control is prevented, so that the shifting control is rapidly completed, and the shifting shock is reduced. For reducing the shifting shock due to an increase of the output torque $T_{OUT}$ during a time period from the point of time t3 to the point of time t4 indicated in FIG. 9, the input torque of the automatic transmission portion 20 may be reduced. For example, the input torque of the automatic transmission portion 20 can be reduced by controlling the first electric motor M1 or second electric motor M2 to generate a reverse drive torque or a regenerative braking torque, or by reducing the engine torque by controlling the amount of fuel supply to the engine 8 or the ignition timing of the engine 8, during the time period from the point of time t3 to the point of time t4 indicated in FIG. 9. Broken lines in FIG. 9 indicate an example where the accelerator pedal is depressed at a lower speed than in the example indicated by solid lines, whereby the shift-down action is performed for a longer time or comparatively slowly (during a time period from the point of time t2 to a point of time t5 indicated in FIG. 9). In the examples of S6 and S7 of FIG. 8 and FIG. 9, the required overlap control involves the switching control to switch the transmission mechanism 10 from the continuously-variable shifting state to the step-variable shifting state and the shift-down control. In another example where the required overlap control involves the switching control to switch the transmission mechanism 10 from the step-variable shifting state to the continuously-variable shifting state and the shift-down control, the shift-down control of the automatic transmission portion 20 may be executed before the switching control to switch the transmission mechanism 10 to the continuously-variable shifting state.

Where the negative decision is obtained in S1 while the affirmative decision is obtained in S2, S1 corresponding to the step-variable shifting control means 54 is implemented to execute the automatic shifting control to shift up the automatic transmission 20 to the fourth gear position, according to the table of FIG. 2, during a time period from a point of time t2 to a point of time t4 indicated in FIG. 10, after a point of time t1 at which a shift-up command is generated. The shift-up control is executed while the input speed of the automatic transmission portion 20 is held fixed at the engine speed NE. For reducing the shifting shock due to generation of an inertia torque during the shift-up control during a time period from a point of time t3 to a point of time t5 indicated in FIG. 10, the input torque of the automatic transmission portion 20 may be reduced. For example, the input torque of the automatic transmission portion 20 can be reduced by controlling the first electric motor M1 or second electric motor M2 to generate a reverse drive torque or a regenerative braking torque, or by reducing the engine torque by controlling the amount of fuel supply to the engine 8 or the ignition timing of the engine 8, during the time period from the point of time t3 to the point of time t4 indicated in FIG. 20. Conversely, the input torque of the automatic transmission portion 20 may be increased by controlling the first electric motor M1 or second electric motor M2 to generate a forward drive torque, or by increasing the engine torque by controlling the fuel supply amount or other parameter of the engine 8, after the point of time t4. Subsequently, S9 corresponding to the switching control means 50 is implemented to switch the transmission mechanism 10 from the step-variable shifting state to the continuously-variable shifting state (during a time period from the point of time t4 to a point of time t5 indicated in FIG. 10. For switching to the continuously-variable shifting state, the switching brake C0 is released since the automatic transmission portion 20 is presently placed in the fourth gear position. Thus, the overlap control is prevented, so that the shifting control is rapidly completed, and the shifting shock is reduced. Broken lines in FIG. 10 indicate an example where the shift-up action is performed for a longer time or comparatively slowly (during a time period from the point of time t2 to a point of time t6 indicated in FIG. 10), for reducing the shifting shock. In this example, the transmission mechanism 10 is switched from the step-variable shifting state to the continuously-variable shifting state after the point of time t6 indicated in FIG. 10. In the examples of S8 and S9 of FIG. 8 and FIG. 10, the required overlap control involves the switching control to switch the transmission mechanism 10 from the step-variable shifting state to the continuously-variable shifting state and the shift-up control. In another example where the required overlap control involves the switching control to switch the transmission mechanism 10 from the continuously-variable shifting state to the step-variable shifting state and the shift-up control, the switching control to switch the transmission mechanism 10 to the step-variable shifting state may be executed before the shift-up control of the automatic transmission portion 20.

When the negative decision is obtained in both S1 and S2, S3 corresponding to the switching control means 50 is implemented to determine whether the transmission 10 is required to be switched between the continuously-variable and step-variable shifting states, without a requirement for a shifting action of the automatic transmission portion 20. This determination as to whether the transmission mechanism 10 should be switched to one of the continuously-variable and step-variable shifting states is made on the basis of the vehicle condition. When an affirmative decision is obtained in S3, S10 also corresponding to the switching control means 50 is implemented to switch the transmission mechanism 10 to a selected one of the continuously-variable and step-variable shifting states. When the determination that the switching from the step-variable shifting state to the continuously-variable shifting state is required is obtained in S3, the hydraulic control unit 42 is commanded to release the switching clutch C0 and brake B0 for switching the transmission mechanism 10 to the continuously-variable shifting state, while at the same time the hybrid control means 52 is commanded to permit the hybrid control. When the determination that the switching from the continuously-variable shifting state to the step-variable shifting state is required is obtained in S3, the hydraulic control unit 42 is commanded to engage the switching clutch C0 if the automatic transmission portion 20 is placed in one of the first through fourth gear positions, or engage the switching brake B0 if the automatic transmission portion 20 is placed in the fifth gear position, for switching the transmission mechanism 10 to the step-variable shifting state, while at the same time the hybrid control means 52 is commanded to inhibit the hybrid control or the continuously-variable shifting control. Alternatively, one of the switching clutch C0 and brake B0 that is engaged to switch the transmission mechanism 10 to the step-variable shifting state is determined on the basis of the output torque $T_{OUT}$ or the vehicle speed V and according to the relation in FIG. 6, such that the switching clutch C0 is engaged when the output torque $T_{OUT}$ is equal to or larger than the upper limit T2, and the switching brake B0 is engaged when the vehicle speed V is equal to or higher than the upper limit V1.

When a negative decision is obtained in S3, S4 corresponding to the step-variable shifting control means 54 is implemented to determine whether the automatic transmission portion 20 is required to be shifted. This determination is made depending upon whether the vehicle condition has been changed so as to move across any shifting boundary line. When an affirmative decision is obtained in S4, S11 also corresponding to the step-variable shifting control means 54 is implemented to execute the automatic shifting control of the automatic transmission portion 20 according to the shifting boundary line map indicated in FIG. 6 by way of example. The table of FIG. 2 indicates the different combinations of the hydraulically operated frictional coupling devices C0, C1, C2, B0, B1, B2 and B3 that are engaged to shift the automatic transmission portion 20 to the respective gear positions. When a negative decision is obtained in S4, S5 is implemented to maintain the present running state of the vehicle.

In the above-described present embodiment provided for the transmission mechanism 10 switchable between the continuously-variable shifting state in which the transmission mechanism 10 is operable as a electrically controlled continuously variable transmission and the step-variable shifting state in which the transmission mechanism 10 is operable as a step-variable transmission, the execution-timing control means 82 (S1, S2) is arranged to command the switching control means 50 (S6, S9) and the step-variable shifting control means 54 (S7, S8) to sequentially execute the switching control of the transmission mechanism 10 by the switching control means 50 (S6, S9) and the shifting control of the automatic transmission portion 20 by the step-variable shifting control means 54 (S7, S8), even when an overlap control involving the switching control and the shifting control is required. Accordingly, the present embodiment prevents overlapping of the switching control and the shifting control, and permits the switching and shifting controls to be rapidly completed. Since the shifting state of the transmission mechanism 10 is not switched under the control of the switching control means 50 during the shifting control of the automatic transmission portion 20 by the step-variable shifting control means 54, the input speed of the automatic transmission portion 20 will not change due to the switching control, apart from a change of the input speed as a result of the shifting control, making it possible to prevent the complicated shifting control and reduce the consequent shifting shock of the automatic transmission portion 20.

The present embodiment is further arranged such that the execution-timing control means 82 commands the switching control means 50 to execute the switching control first, so that the overlapping of the switching and shifting controls is prevented. For example, the switching control by the switching control means 50 to switch the transmission mechanism 10 from the continuously-variable shifting state to the step-variable shifting state is executed before the shifting control of the automatic transmission portion 20 by the step-variable shifting control means 54. In this case, the shifting control of the automatic transmission portion 20 is executed after the input speed of the automatic transmission portion 20 has been stabilized, so that the complicated shifting control is prevented, and the shifting control is rapidly completed, whereby the shifting shock is reduced. Where the switching control by the switching control means 50 to switch the transmission mechanism 10 from the step-variable shifting state to the continuously-variable shifting state is executed before the shifting control of the automatic transmission portion 20 by the step-variable shifting control means 54, the input speed of the automatic transmission portion 20 is rapidly changed by the transmission mechanism 10 placed in the continuously-variable shifting state, so that the shifting control of the automatic transmission is rapidly completed, whereby the shifting shock is reduced.

The present embodiment is further arranged such that the execution-timing control means 82 commands the shifting control means 50 to execute the shifting control first. Accordingly, the overlapping of the switching and shifting controls is prevented. For example, the shifting control of the automatic transmission portion 20 by the step-variable shifting control means 54 is first executed while the transmission mechanism 10 is maintained in the step-variable shifting control state, and then the switching control by the switching control means 50 to switch the transmission mechanism 10 from the step-variable shifting state to the continuously-variable shifting state is executed. In this case, the shifting control of the automatic transmission portion 20 is executed while the input speed of the automatic transmission portion 20 is held stable, so that the complicated shifting control is prevented, and the shifting control is rapidly completed, whereby the shifting shock is reduced. Where the shifting control of the automatic transmission portion 20 by the step-variable shifting control means 54 is first executed while the transmission mechanism 10 is maintained in the continuously-variable shifting state, and then the switching control by the switching control means 50 to switch the transmission mechanism 10 from the continuously-variable shifting state to the step-variable sifting state, the input speed of the automatic transmission portion 20 is rapidly changed by the transmission mechanism 10 maintained in the continuously-variable shifting state, so that the shifting control of the automatic transmission portion 20 is rapidly completed, whereby the shifting shock is reduced.

The present embodiment is further arranged such that the execution-timing control means 82 determines one of the switching control by the switching control means 50 and the shifting control by the step-variable shifting control means 54 which should be executed before the other of the switching and shifting controls, on the basis of the condition of the vehicle. Accordingly, the overlapping of the switching and shifting controls is suitably prevented depending upon the condition of the vehicle.

The present embodiment is further arranged such that the execution-timing control means 82 determines one of the switching control by the switching control means 50 and the shifting control by the step-variable shifting control means 54 which should be executed before the other of the switching and shifting controls, on the basis of one of the continuously-variable and step-variable shifting states in which the transmission mechanism 10 is presently placed. Accordingly, the overlapping of the switching and shifting controls is prevented.

The present embodiment is further arranged such that the execution-timing control means 82 determines one of the switching control by the switching control means 50 and the shifting control by the step-variable shifting control means 54 which should be executed before the other of the switching and shifting controls, on the basis of one of the continuously-variable and step-variable shifting states to which the transmission mechanism 10 is to be switched. Accordingly, the overlapping of the switching and shifting controls is prevented.

The present embodiment is further arranged such that the execution-timing control means 82 determines one of the switching control by the switching control means 50 and the shifting control by the step-variable shifting control means 54 which should be executed before the other of the switching and shifting controls, depending upon whether the transmission mechanism 10 is switched from the step-variable shifting state to the continuously-variable shifting state or whether the transmission mechanism 10 is switched from the continuously-variable shifting state to the step-variable shifting state. Accordingly, the overlapping of the switching and shifting controls is prevented.

The present embodiment is further arranged such that the predetermined condition of the vehicle is determined on the basis of the predetermined upper limit value V1 of a running speed of the vehicle, and the switching control means places the transmission mechanism 10 in the step-variable shifting state when the actual value V of the running speed of the vehicle is higher than the predetermined upper limit value V1. When the actual vehicle speed V is higher than the upper limit value V1, therefore, the output of the engine 8 is transmitted to the drive wheels 38 primarily through a mechanical power transmitting path, so that the fuel economy is improved owing to reduction of a loss of conversion between mechanical and electric energies in the step-variable shifting state as compared with that in the continuously-variable shifting state.

The present embodiment is further arranged such that the predetermined condition of the vehicle is determined on the basis of the predetermined upper limit value T1 of the drive-force-related value of the vehicle, and the switching control means 50 places the transmission mechanism 10 in the step-variable shifting state when the drive-force-related value $T_{OUT}$ of the vehicle is higher than the predetermined upper limit value T1. According to this arrangement, the output of the engine 8 is transmitted to the drive wheels 38 primarily through a mechanical power transmitting path, when the drive-force-related value $T_{OUT}$ is higher than the predetermined upper limit T1. Accordingly, the required maximum amount of electric energy that should be generated by the first electric motor can be reduced, so that the required size of the first electric motor M1 can be reduced, whereby the required size of the vehicular drive system including the first electric motor M1 can be reduced.

The present embodiment is further arranged such that the predetermined condition of the vehicle is determined on the basis of the actual value V of the running speed of the vehicle and the actual value $T_{OUT}$ of the drive-force-related value of the vehicle and according to the stored switching boundary line map which includes the upper speed limit V1 and the upper output torque limit T1 and which is defined by parameters in the form of the running speed v of the vehicle and the drive-force-related value $T_{OUT}$. According to this arrangement, the determination by the switching control means 50 as to whether the vehicle is in the high-speed running state or in the high-output running state can be facilitated.

The present embodiment is further arranged such that the predetermined condition of the vehicle is a functional-deterioration determining condition which is satisfied when a function of any one of control components for placing the transmission mechanism 10 in the electrically established continuously-variable shifting state is deteriorated, and the switching control means 50 places the transmission mechanism 10 in the step-variable shifting state when the functional-deterioration determining condition is satisfied. According to this arrangement, in the event of determination of the functional deterioration which disables the transmission mechanism 10 to be placed in the continuously-variable shifting state, the transmission mechanism 10 is placed in the step-variable shifting state, so that the vehicle can be run in the step-variable shifting state, even in the presence of the functional deterioration.

The present embodiment is further arranged such that the power distributing mechanism 16 is simply constituted by the first planetary gear set 24 of a single-pinion type including the first carrier CA1, first sun gear S1 and first ring gear R1 as the three elements, and has a relatively small axial dimension. Further, the power distributing mechanism 16 is provided with the hydraulically operated frictional coupling devices in the form of the switching clutch C0 operable to connect the first sun gear S1 and the first carrier CA1 to each other, and the switching brake B0 operable to fix the first sun gear S1 to the transmission casing 12. These switching clutch C0 and brake B0 are easily controlled by the switching control means 50 to switch the transmission mechanism 10 between the continuously-variable and step-variable shifting states.

The present embodiment is further arranged such that the automatic transmission portion 20 is disposed between the power transmitting member 18 and the drive wheels 38 and connected in series to the power distributing mechanism 16, and the overall speed ratio of the transmission mechanism 10 is determined by the speed ratio of the power distributing mechanism 16 (speed ratio of the switchable type transmission portion 11) and the speed ratio of the automatic transmission portion 20. According to this arrangement, the vehicle drive force can be obtained over a wide range of the speed ratio, by utilizing the speed ratio of the automatic transmission, so that the efficiency of the continuously-variable shifting control of the switchable type transmission portion 11, that is, the hybrid control efficiency can be improved.

The present embodiment is further arranged such that when the transmission mechanism 10 is placed in the step-variable shifting state, the switchable type transmission portion 11 functions as if it were a part of the automatic transmission portion 20, and provides an overdrive gear position in the form of the fifth gear position having a speed ratio lower than 1.

The present embodiment is further arranged such that the switching control means 50 (S10) automatically switches the transmission mechanism 10 between the continuously-variable shifting state and the step-variable shifting state, on the basis of the predetermined condition of the vehicle. According to this arrangement, the drive system has not only an advantage of an improvement in the fuel economy owing to the function of the electrically controlled continuously variable transmission, but also an advantage of high power transmitting efficiency owing to the function of the step-variable transmission capable of mechanically transmitting a vehicle drive force. Namely, the transmission mechanism 10 is placed in the continuously-variable shifting state, when the engine output is in a normal range, for instance, when the vehicle condition is in the continuously-variable shifting region shown in FIG. 7, or in the continuously-variable shifting region indicated in FIG. 6 in which the vehicle speed V and the output torque Tour are lower than the respective upper limits V2, T1. Accordingly, the fuel economy of the vehicle is improved in an ordinary city-running of the vehicle, that is, in a low- or medium-speed running or in a low- or medium-output running of the vehicle. When the vehicle is in a high-speed running state, on the other hand, for example, when the vehicle condition is in the step-variable shifting region indicated in FIG. 6 in which the vehicle speed V is higher than the upper limit V1, the transmission mechanism 10 is placed in the step-variable shifting state in which the output of the engine 8 is transmitted to the drive wheels 38 primarily through a mechanical power transmitting path, so that the fuel economy is improved owing to reduction of a loss of energy conversion between mechanical and electric energies, which would take place when the transmission mechanism 10 is operated as the electrically controlled continuously variable transmission. When the vehicle is in a high-output running state, for instance, when the vehicle condition is in the step-variable shifting region indicated in FIG. 6 in which the actual output torque Tour is higher than the upper limit T1, the transmission mechanism 10 is placed in the step-variable shifting state. Thus, the transmission mechanism 10 is operated as the electrically controlled continuously variable transmission, only when the vehicle is in the low- or medium-speed running state or in the low- or medium-output running state, so that the required amount of electric energy generated by the first electric motor M1, that is, the maximum amount of electric energy that must be transmitted from the first electric motor M1 can be reduced, making it possible to minimize the required sizes of the first electric motor M1 and the second electric motor M2, and the required size of the drive system including the electric motor.

The present embodiment is further arranged such that the second electric motor M2 is directly connected to the power transmitting member 18 which is the input rotary member of the automatic transmission portion 20. According to this arrangement, the required output torque of the second electric motor M2 can be reduced with respect to the torque of the output shaft 22 of the automatic transmission portion 20, so that the required size of the second electric motor M2 can be reduced.

Other embodiments of the present invention will be described. In the following description, the same reference signs as used in the preceding embodiment will be used to identify the corresponding elements, which will not be described.

Embodiment 2

Figures 12, 13:
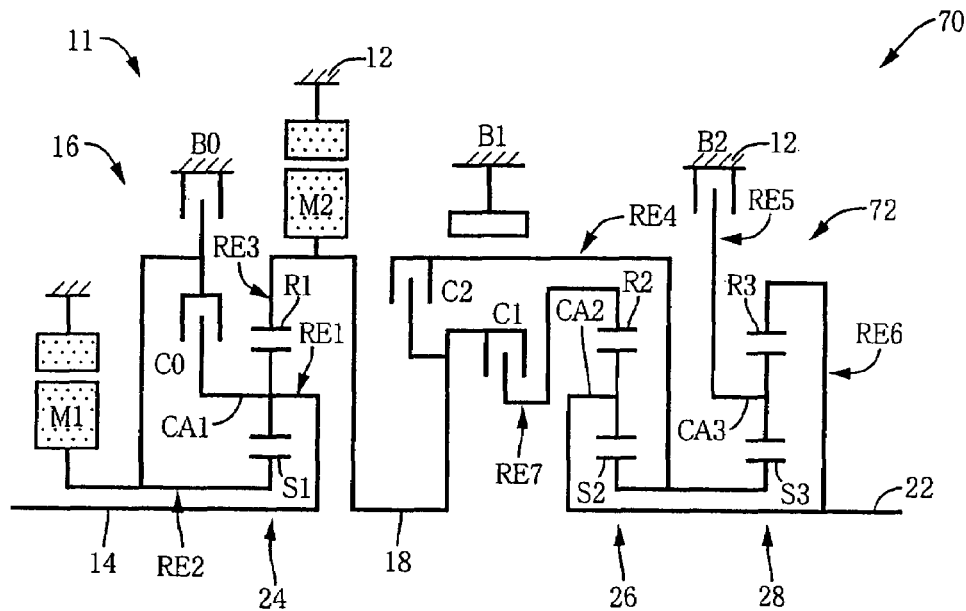
FIG. 12 This figure is a schematic view corresponding to that of FIG. 1, showing an arrangement of a hybrid vehicle drive system according to another embodiment of the present invention.
FIG. 13 This figure is a table corresponding to that of FIG. 2, indicating shifting actions of the hybrid vehicle drive system of the embodiment of FIG. 12, which is operable in a continuously-variable shifting state and a step-variable shifting state, in relation to different combinations of operating states of hydraulically operated frictional coupling devices to effect the respective shifting actions.
Figure 14:
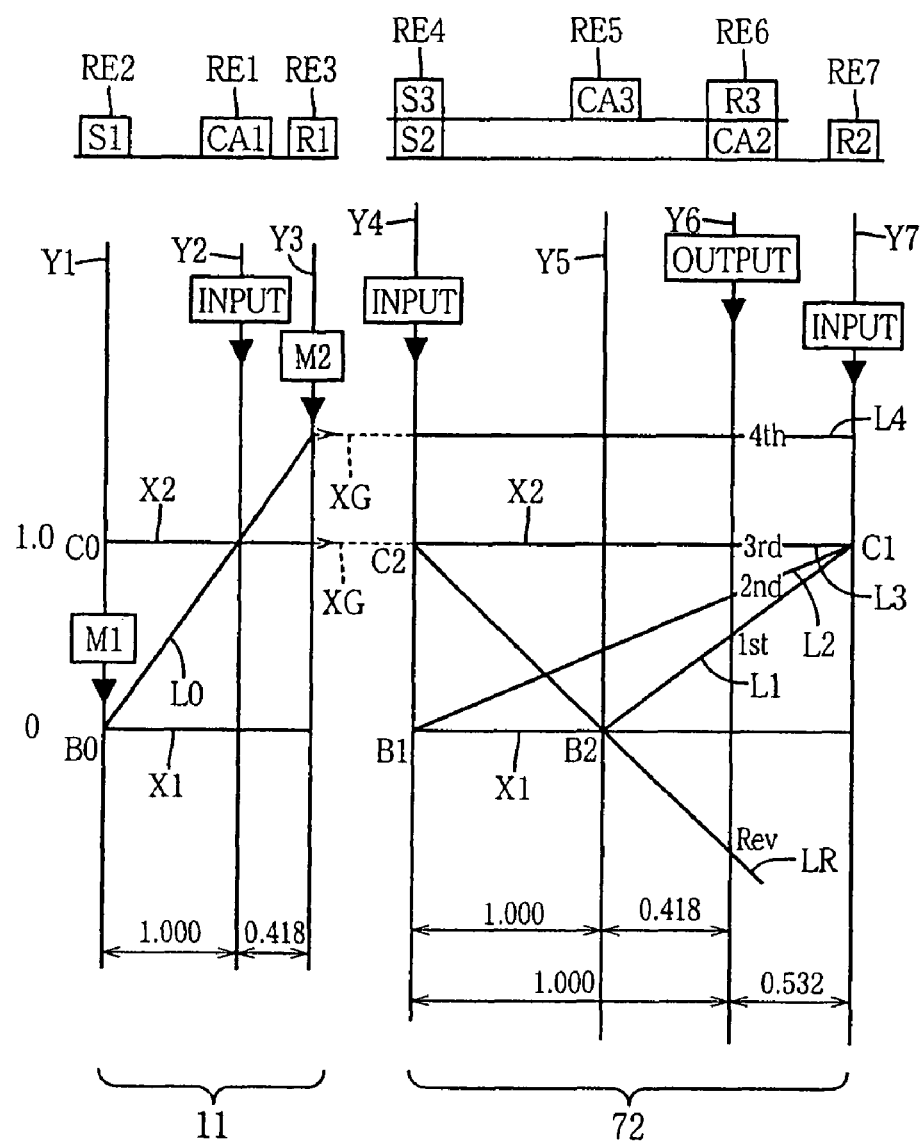
FIG. 14 This figure is a collinear chart corresponding to that of FIG. 3, indicating relative rotating speeds of the rotary elements of the hybrid vehicle drive system of the embodiment of FIG. 12 operated in the step-variable shifting state in the different gear positions.

FIG. 12 is a schematic view showing an arrangement of a transmission mechanism 70, which is controllable by the control device according to the present invention, and FIG. 13 is a table indicating a relationship between the gear positions of the transmission mechanism 70 and different combinations of operating states of hydraulically operated frictional coupling devices for establishing the respective gear positions, while FIG. 14 is a collinear chart for explaining a shifting operation of the transmission mechanism 70.

The transmission mechanism 70 includes the switchable type transmission portion 11 having the first electric motor M1, power distributing mechanism 16 and second electric motor M2, as in the first embodiment. The transmission mechanism 70 further includes an automatic transmission portion 72 having three forward drive positions. The automatic transmission portion 72 is disposed between the switchable type transmission portion 11 and the output shaft 22 and is connected in series to the switchable type transmission portion 11 and output shaft 22, through the power transmitting member 18. The power distributing mechanism 16 includes the first planetary gear set 24 of single-pinion type having a gear ratio $\rho 1$ of about 0.418, for example, and the switching clutch C0 and the switching brake B0, as in the first embodiment. The automatic transmission portion 72 includes a single-pinion type second planetary gear set 26 having a gear ratio $\rho 2$ of about 0.532, for example, and a single-pinion type third planetary gear set 28 having a gear ratio $\rho 3$ of about 0.418, for example. The second sun gear S2 of the second planetary gear set 26 and the third sun gear S3 of the third planetary gear set 28 are integrally fixed to each other as a unit, selectively connected to the power transmitting member 18 through the second clutch C2, and selectively fixed to the transmission casing 12 through the first brake B1. The second carrier CA2 of the second planetary gear set 26 and the third ring gear R3 of the third planetary gear set 28 are integrally fixed to each other and fixed to the output shaft 22. The second ring gear R2 is selectively connected to the power transmitting member 18 through the first clutch C1, and the third carrier CA3 is selectively fixed to the casing 12 through the second brake B2.

In the transmission mechanism 70 constructed as described above, one of a first gear position (first speed position) through a fourth gear position (fourth speed position), a reverse gear position (rear-drive position) and a neural position is selectively established by engaging actions of a corresponding combination of the frictional coupling devices selected from the above-described switching clutch C0, first clutch C1, second clutch C2, switching brake B0, first brake B1 and second brake B2, as indicated in the table of FIG. 13. Those gear positions have respective speed ratios $\gamma$ (input shaft speed NIN/output shaft speed NOUT) which change as geometric series. In particular, it is noted that the power distributing mechanism 16 provided with the switching clutch C0 and brake B0 can be selectively placed by engagement of the switching clutch C0 or switching brake B0, in the fixed-speed-ratio shifting state in which the mechanism 16 is operable as a transmission having fixed speed ratio or ratios, as well as in the continuously-variable shifting state in which the mechanism 16 is operable as a continuously variable transmission described above. In the present transmission mechanism 70, therefore, a step-variable transmission is constituted by the automatic transmission portion 20, and the switchable type transmission portion 11 which is placed in the fixed-speed-ratio shifting state by engagement of the switching clutch C0 or switching brake B0. Further, a continuously variable transmission is constituted by the automatic transmission portion 20, and the switchable type transmission portion 11 which is placed in the continuously-variable shifting state, with none of the switching clutch C0 and brake B0 being engaged. In other words, the transmission mechanism 70 is switched to the step-variable shifting state, by engaging one of the switching clutch C0 and switching brake B0, and to the continuously-variable shifting state by releasing both of the switching clutch C0 and switching brake B0.

Where the transmission mechanism 70 functions as the step-variable transmission, for example, the first gear position having the highest speed ratio γ1 of about 2.804, for example, is established by engaging actions of the switching clutch C0, first clutch C1 and second brake B2, and the second gear position having the speed ratio γ2 of about 1.531, for example, which is lower than the speed ratio γ1, is established by engaging actions of the switching clutch C0, first clutch C1 and first brake B1, as indicated in FIG. 13. Further, the third gear position having the speed ratio γ3 of about 1.000, for example, which is lower than the speed ratio γ2, is established by engaging actions of the switching clutch C0, first clutch C1 and second clutch C2, and the fourth gear position having the speed ratio γ4 of about 0.705, for example, which is lower than the speed ratio γ3, is established by engaging actions of the first clutch C1, second clutch C2, and switching brake B0. Further, the reverse gear position having the speed ratio γR of about 2.393, for example, which is intermediate between the speed ratios γ1 and γ2, is established by engaging actions of the second clutch C2 and the second brake B2. The neutral position N is established by engaging only the switching clutch C0.

When the transmission mechanism 70 functions as the continuously-variable transmission, on the other hand, the switching clutch C0 and the switching brake B0 indicated in FIG. 13 are both released, so that the switchable type transmission portion 11 functions as the continuously variable transmission, while the automatic transmission portion 72 connected in series to the switchable type transmission portion 11 functions as the step-variable transmission, whereby the speed of the rotary motion transmitted to the automatic transmission portion 72 placed in one of the first through third gear positions, namely, the rotating speed of the power transmitting member 18 is continuously changed, so that the speed ratio of the transmission mechanism 10 when the automatic transmission portion 72 is placed in one of those gear positions is continuously variable over a predetermined range. Accordingly, the speed ratio of the automatic transmission portion 72 is continuously variable across the adjacent gear positions, whereby the overall speed ratio yT of the transmission mechanism 70 is continuously variable.

The collinear chart of FIG. 14 indicates, by straight lines, a relationship among the rotating speeds of the rotary elements in each of the gear positions of the transmission mechanism 70, which is constituted by the switchable type transmission portion 11 functioning as the continuously-variable shifting portion or first shifting portion, and the automatic transmission portion 72 functioning as the step-variable shifting portion or second shifting portion. The collinear chart of FIG. 14 indicates the rotating speeds of the individual elements of the power distributing mechanism 16 when the switching clutch C0 and brake B0 are both released, and the rotating speeds of those elements when the switching clutch C0 or brake B0 is engaged, as in the preceding embodiments When the first clutch C1 and the second brake B2 are engaged, the automatic transmission portion 72 is placed in the first gear position. The rotating speed of the output shaft 22 in the first gear position is represented by a point of intersection between the vertical line Y6 indicative of the rotating speed of the sixth rotary element RE6 fixed to the output shaft 22 and an inclined straight line L1 which passes a point of intersection between the vertical line Y7 indicative of the rotating speed of the seventh rotary element RE7 (R2) and the horizontal line X2, and a point of intersection between the vertical line Y5 indicative of the rotating speed of the fifth rotary element RE5 (CA3) and the horizontal line X1, as indicated in FIG. 28. Similarly, the rotating speed of the output shaft 22 in the second gear position established by the engaging actions of the first clutch C1 and first brake B1 is represented by a point of intersection between an inclined straight line L2 determined by those engaging actions and the vertical line Y6 indicative of the rotating speed of the sixth rotary element RE6 (CA2, R3) fixed to the output shaft 22. The rotating speed of the output shaft 22 in the third speed position established by the engaging actions of the first clutch C1 and second clutch C2 is represented by a point of intersection between an inclined straight line L3 determined by those engaging actions and the vertical line Y6 indicative of the rotating speed of the sixth rotary element RE6 fixed to the output shaft 22. In the first through third gear positions in which the switching clutch C0 is placed in the engaged state, the seventh rotary element RE7 is rotated at the same speed as the engine speed $N_E$, with the drive force received from the switchable type transmission portion 11. When the switching brake B0 is engaged in place of the switching clutch C0, the sixth rotary element RE6 is rotated at a speed higher than the engine speed $N_E$, with the drive force received from the switchable type transmission portion 11. The rotating speed of the output shaft 22 in the fourth gear position established by the engaging actions of the first clutch C1, second clutch C2 and switching brake B0 is represented by a point of intersection between a horizontal line L4 determined by those engaging actions and the vertical line Y6 indicative of the rotating speed of the sixth rotary element RE6 fixed to the output shaft 22.

The transmission mechanism 70 is also constituted by the switchable type transmission portion 11 functioning as the continuously-variable shifting portion or first shifting portion, and the automatic transmission portion 72 functioning as the step-variable shifting portion or second shifting portion, so that the present transmission mechanism 70 has advantages similar to those of the first embodiment.

Embodiment 3

Figure 15:
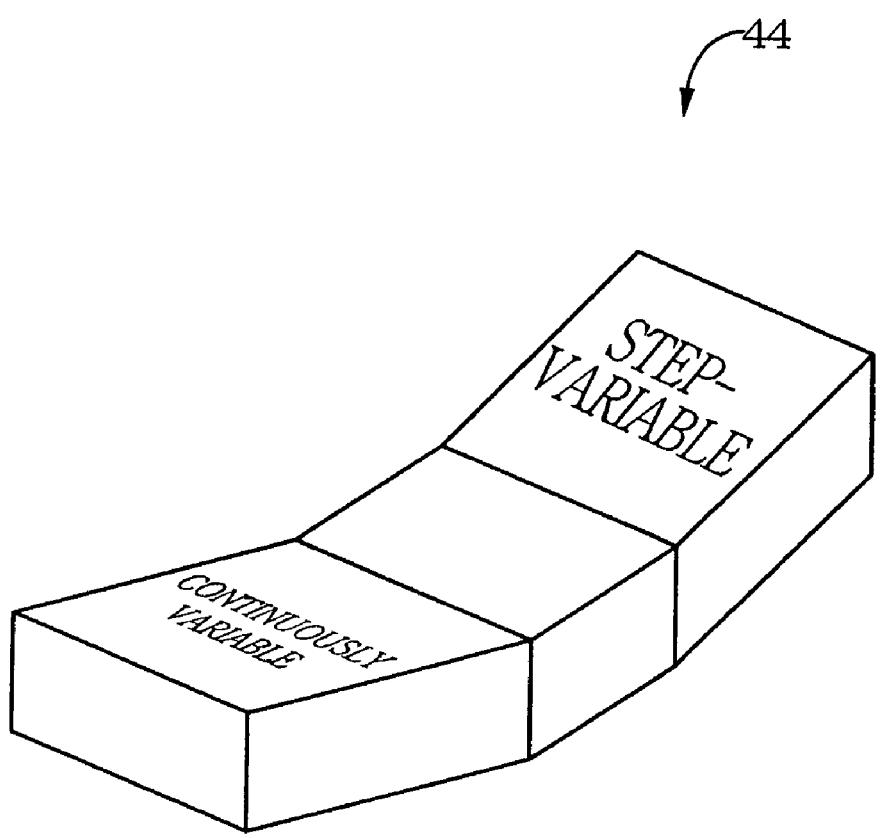
FIG. 15 This figure is a view showing an example of a manually operable shifting-state selecting device in the form of a seesaw switch 44 provided as a switching device for selecting the shifting state.

FIG. 15 shows an example of a seesaw switch 44 functioning as a shifting-state selecting device, which is manually operable to select the shifting state of the transmission mechanism 10. In the preceding embodiment, the automatic switching control of the shifting state of the transmission mechanism 10 and the automatic shifting control of the automatic transmission portion 20 are effected on the basis of the vehicle condition and according to the relations indicated in FIG. 6, so as to prevent overlapping of those switching and shifting controls. However, the shifting state of the transmission mechanism 10 may be manually switched by a manual operation of the seesaw switch 44. In this case, the switching control of the transmission mechanism 10 is effected to prevent overlapping of this switching control and the automatic shifting control of the automatic transmission portion 20. The principle of the present invention is also applicable to the automatic switching control of the shifting state of the transmission mechanism 10, and a manual shifting control to manually select one of shift ranges or gear positions of the automatic transmission portion in a manual shifting mode, so as to prevent overlapping of those automatic switching and manual shifting controls.

While the preferred embodiments of the present invention have been described above in detail by reference to the accompanying drawings, it is to be understood that the present invention may be otherwise embodied.

In the power distributing mechanism 16 in the illustrated embodiments, the first carrier CA1 is fixed to the engine 8, and the first sun gear S1 is fixed to the first electric motor M1 while the first ring gear R1 is fixed to the power transmitting member 18. However, this arrangement is not essential. The engine 8, first electric motor M1 and power transmitting member 18 may be fixed to any other elements selected from the three elements CA1, S1 and R1 of the first planetary gear set 24.

Although the power distributing mechanism 16 described above is provided with the switching clutch C0 and the switching brake B0, the power distributing mechanism 16 need not be provided with both of the switching clutch C0 and brake B0, that is, only one of the switching clutch C0 and brake B0 may be provided. While the switching clutch C0 is provided to selectively connect the first sun gear S1 and the first carrier CA1 to each other, the switching clutch C0 may be provided to selectively connect the first sun gear S1 and the first ring gear R1 to each other, or selectively connect the first carrier CA1 and the first ring gear R1. Namely, the switching clutch C0 may be arranged to connect any two elements of the three elements of the first planetary gear set 24.

The hydraulically operated frictional coupling devices used as the switching clutch C0, switching brake B0, etc. in the illustrated embodiments may be replaced by a coupling device of a magnetic-power type, an electromagnetic type or a mechanical type, such as a powder clutch (magnetic powder clutch), an electromagnetic clutch and a meshing type dog clutch.

In the illustrated embodiments, the second electric motor M2 is fixed to the power transmitting member 18. However, the second electric motor M2 may be fixed to the output shaft 22 or to a rotary member of the automatic transmission portion 20, 72.

In the illustrated embodiments, the automatic transmission portion 20, 72 is disposed in the power transmitting path between the drive wheels 38, and the power transmitting member 18 which is the output member of the switchable type transmission portion 11, 90 or power distributing mechanism 16. However, the automatic transmission portion 20, 72 may be replaced by any other type of power transmitting device such as a continuously variable transmission (CVT), which is a kind of an automatic transmission. Where the continuously variable transmission (CVT) is provided, the transmission mechanism as a whole may be placed in the step-variable shifting state when the power distributing mechanism 16 is placed in the fixed-speed-ratio shifting state. The fixed-speed-ratio shifting state is defined as a state in which power is transmitted primarily through a mechanical power transmitting path, without power transmission through an electric path.

In the illustrated embodiments, the transmission mechanism 10, 70 is used for a hybrid vehicle wherein the drive wheels 38 can be driven by not only the engine 8 but also the torque of the first or second electric motor M1, M2. However, the principle of the present invention is applicable to a non-hybrid vehicular drive system wherein the switchable type transmission portion 11 or power distributing mechanism 16 of the transmission mechanism 10, 70 is operable only as a continuously variable transmission which has an electrical CVT function.

The power distributing mechanism 16 provided in the illustrated embodiments may be replaced by a differential gear device including a pinion rotated by an engine, for example, and a pair of bevel gears which mesh with the pinion and which are connected to the first electric motor M1 and the second electric motor M2.

Although the power distributing mechanism 16 is constituted by one planetary gear set in the illustrated embodiments, the power distributing mechanism 16 may be constituted by two or more planetary gear sets and arranged to be operable as a transmission having three or more gear positions when placed in its fixed-speed-ratio shifting state.

While the switch 44 described above is of a seesaw type, the switch 44 may be replaced by a single pushbutton switch, two pushbutton switches that are selectively pressed into operated positions, a lever type switch, a slide-type switch or any other type of switch or switching device that is operable to select a desired one of the continuously-variable shifting state and the step-variable shifting state.

While the preferred embodiments of the present invention have been described above for illustrative purpose only, it is to be understood that the invention may be embodied with various changes and, modifications which may occur to those skilled in the art.

The invention claimed is:

1. A control device for a vehicular drive system which is arranged to transmit an output of an engine to a drive wheel of a vehicle and which comprises a switchable type transmission mechanism including (i) a power distributing mechanism switchable between a continuously-variable shifting state in which the power distributing mechanism is operable as an electrically controlled continuously variable transmission, and a step-variable shifting state in which the power distributing mechanism is operable as a step-variable transmission, and (ii) an automatic transmission, said control device comprising:
a switching controller configured to control said power distributing mechanism selectively in one of said continuously-variable shifting state and said step-variable shifting state, on the basis of a condition of the vehicle;
a shifting controller configured to control a shifting operation of said automatic transmission included in the switchable type transmission mechanism, on the basis of the condition of the vehicle; and
an execution-timing controller configured to control said switching controller to sequentially execute a switching control of said power distributing mechanism and to control said shifting controller to sequentially execute a shifting control of said automatic transmission, so as to prevent an overlap control involving simultaneous execution of both said switching control and said shifting control, when the switching control of the power distributing mechanism and the shifting control of the automatic transmission are judged to overlap each other.

2. The control device according to claim 1, wherein said execution-timing controller commands said switching controller and said shifting controller such that said switching controller executes said switching control before said shifting controller executes said shifting control.

3. The control device according to claim 1, wherein said execution-timing controller commands said shifting controller and said switching controller such that said shifting controller executes said shifting control before said switching controller executes said switching control.

4. The control device according to claim 1, wherein said execution-timing controller determines one of said switching control by said switching controller and said shifting control by said shifting controller which should be executed before the other of said switching and shifting controls, on the basis of the condition of the vehicle.

5. The control device according to claim 1, wherein said execution-timing controller determines one of said switching control by said switching controller and said shifting control by said shifting controller which should be executed before the other of said switching and shifting controls, on the basis of one the continuously-variable and step-variable shifting states in which said switchable type transmission mechanism is presently placed.

6. The control device according to claim 1, wherein said execution-timing controller determines one of said switching control by said switching controller and said shifting control by said shifting controller which should be executed before the other of said switching and shifting controls, on the basis of one of the continuously-variable and step-variable shifting states to which said switchable type transmission mechanism is to be switched.

7. The control device according to claim 1, wherein said switching controller includes a high-speed-running determining portion configured to determine that the vehicle is in a high-speed running state when an actual value of a running speed of the vehicle is higher than a predetermined upper limit value, said switching controller controlling said switchable type transmission mechanism to said step-variable shifting state when said high-speed-running determining portion has determined that the vehicle is in said high-speed running state.

8. The control device according to claim 1, wherein said switching controller includes a high-output-running determining portion configured to determine that the vehicle is in a high-output running state when a drive-force-related value of the vehicle is higher than a predetermined upper limit value, said switching controller controlling said switchable type transmission mechanism in said step-variable shifting state when said high-output-running determining portion has determined that the vehicle is in said high-output running state.

9. The control device according to claim 1, wherein said switching controller places said switchable type transmission mechanism in one of said continuously-variable and step-variable shifting states, on the basis of an actual value of a running speed of the vehicle and an actual value of a drive-force-related value of the vehicle and according to a stored switching boundary line map including a high-speed-running boundary line and a high-output-running boundary line which are defined by parameters in the form of said running speed of the vehicle and said drive-force-related value.

10. The control device according to claim 1, wherein said switching controller includes electric-path-function diagnosing means for determining whether a function of any one of control components for placing said switchable type transmission mechanism in said continuously-variable shifting state is deteriorated, said switching controller placing said switchable type transmission mechanism in said step-variable shifting state when said electric-path-function diagnosing means has determined that the function of said any one of the control components is deteriorated.

11. The control device according to claim 1, wherein said switchable type transmission mechanism includes an electric motor, a power distributing mechanism operable to distribute the output of said engine to said first electric motor and a power transmitting member, and a second electric motor disposed between said power transmitting member and said drive wheel, said power distributing mechanism having a first element fixed to said engine, a second element fixed to said first electric motor, and a third element fixed to said second electric motor and said power transmitting member, and wherein said power distributing mechanism includes an operating-state switching device operable to switch said switchable type transmission mechanism between said continuously-variable and step-variable shifting states, and said switching controller controls said operating-state switching device to thereby switch said switchable type transmission mechanism between said continuously-variable and step-variable shifting states.

12. The control device according to claim 11, wherein said operating-state switching device includes a coupling device operable to connect any two of said first through third elements to each other, and/or fix said second element to a stationary member, and wherein said switching controller places said switchable type transmission mechanism in said continuously-variable shifting state by releasing said coupling device to thereby permit said first element, said second element and said third element to be rotated relative to each other, and places said switchable type transmission mechanism in said step-variable shifting state by engaging said coupling device to thereby connect at least two of said first element, said second element and said third element to each other or fix said second element to said stationary member.

13. The control device according to claim 12, wherein said power distributing mechanism is a planetary gear set including a carrier functioning as said first element, a sun gear functioning as said second element, and a ring gear functioning as said third element, and wherein said coupling device includes a clutch operable to connect any two of said carrier, sun gear and ring gear to each other, and/or a brake operable to fix said sun gear to said stationary member.

14. The control device according to claim 13, wherein said planetary gear set is of a single-pinion type.

15. The control device according to claim 14, wherein said switching controller controls said coupling device to connect said carrier and said sun gear to each other, to thereby enable said planetary gear set of the single-pinion type to operate as a transmission having a speed ratio of 1, or fix said sun gear to said stationary member, to thereby enable said planetary gear set of the single-pinion type to operate as a speed-increasing transmission having a speed ratio lower than 1.

16. The control device according to claim 11, wherein said automatic transmission is disposed between said power transmitting member and said drive wheel and connected in series to said power distributing mechanism, and said switchable type transmission mechanism has a speed ratio determined by a speed ratio of said automatic transmission.

17. The control device according to claim 16, wherein said switchable type transmission mechanism has an overall speed ratio determined by a speed ratio of the power distributing mechanism and the speed ratio of said automatic transmission.

18. The control device according to claim 16, wherein said automatic transmission is a step-variable automatic transmission which is shifted according to a stored shifting boundary line map.

* * * * *